US012763882B2

(12) United States Patent
Yoshikawa

(10) Patent No.: US 12,763,882 B2
(45) Date of Patent: Oct. 13, 2026

(54) COMMUNICATION APPARATUS, CONTROL METHOD FOR COMMUNICATION APPARATUS, AND COMPUTER-READABLE STORAGE MEDIUM

(71) Applicant: Canon Kabushiki Kaisha, Tokyo (JP)

(72) Inventor: Yuki Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 18/161,151

(22) Filed: Jan. 30, 2023

(65) Prior Publication Data

US 2023/0179334 A1 Jun. 8, 2023

Related U.S. Application Data

(63) Continuation of application No. PCT/JP2021/029811, filed on Aug. 13, 2021.

(30) Foreign Application Priority Data

Aug. 31, 2020 (JP) ................................ 2020-145853

(51) Int. Cl.
*H04L 1/1607* (2023.01)
*H04L 5/00* (2006.01)

(52) U.S. Cl.
CPC .......... *H04L 1/1628* (2013.01); *H04L 5/0055* (2013.01)

(58) Field of Classification Search
CPC ... H04L 1/1628; H04L 1/1614; H04L 1/1825; H04L 1/1685; H04L 5/0055;
(Continued)

(56) References Cited

U.S. PATENT DOCUMENTS 8,107,478 B2 1/2012 Naito et al.
8,175,047 B2 5/2012 Seok et al.
(Continued)

FOREIGN PATENT DOCUMENTS

CN 101594366 A 12/2009
CN 106506125 A 3/2017
(Continued)

OTHER PUBLICATIONS

Indian Office Action issued Mar. 5, 2024 in counterpart Indian Patent Appln. No. 202317014455.
(Continued)

*Primary Examiner* — Jamal Javaid
(74) *Attorney, Agent, or Firm* — Venable LLP

(57) ABSTRACT

A communication apparatus complying with an IEEE802.11 series standard receives, from a first other communication apparatus, a data frame including data units and an indication of a sequence number assigned to at least one data unit of the data units, transmits, to a second other communication apparatus, a data frame including the sequence number and the at least one data unit, receives, from the second other communication apparatus, a reception confirmation with respect to the transmitted data frame, and transmits, to the first other communication apparatus, information of the sequence number of the data unit received by the second other communication apparatus, which is included in the reception confirmation.

10 Claims, 15 Drawing Sheets

(58) Field of Classification Search
CPC .... H04L 5/0053; H04W 40/22; H04W 40/24; H04W 40/32; H04W 28/04; H04W 28/14
See application file for complete search history.

(56) References Cited

U.S. PATENT DOCUMENTS

| | | | | |
|---|---|---|---|---|
| 9,236,931 | B2 | 1/2016 | Ukita et al. | |
| 10,791,572 | B2 | 9/2020 | Umehara | |
| 2012/0014335 | A1 * | 1/2012 | Adachi ................. | H04W 48/08 370/329 |
| 2013/0336196 | A1 | 12/2013 | Abraham | |
| 2020/0100138 | A1 * | 3/2020 | Wu ....................... | H04L 1/1858 |
| 2020/0119863 | A1 | 4/2020 | Nakanishi | |

FOREIGN PATENT DOCUMENTS

| | | | |
|---|---|---|---|
| JP | 2010-050770 | A | 3/2010 |
| JP | 2011-503997 | A | 1/2011 |
| JP | 2018-050133 | A | 3/2018 |
| KR | 20100085122 | A | 7/2010 |
| WO | 2007095967 | A1 | 8/2007 |
| WO | 2009/061110 | A1 | 5/2009 |
| WO | 2012/140850 | A1 | 10/2012 |
| WO | 2018008237 | A1 | 1/2018 |

OTHER PUBLICATIONS

Extended European Search Report dated Sep. 2, 2024 in counterpart European Patent Appln. No. 21861280.
Kosuke Aio et al., "Consideration on Multi-AP Ack Protocol," Sony Corporation, IEEE 802.11-19/1533r0; Sep. 15, 2019, 10 pages.
Dan Yang et al., "Discussion on HARQ for EHT," ZTE Corp., IEEE 802.11-18/1963r1; Nov. 11, 2018, 10 pages.
Sungjin Park et al., "Multi-AP Transmission Procedure," LG Electronics, IEEE 802.11-19/0804r0; May 13, 2019, 14 pages.
International Search Report issued Sep. 7, 2021 in parent PCT Appln. No. PCT/JP2021/029811.
Japanese Office Action issued Aug. 19, 2024 in counterpart Japanese Patent Appln. No. 2020-145853.
European Office Action dated Jul. 21, 2025 in counterpart European Patent Appln. No. 21861280.2.
Korean Office Action dated Jun. 18, 2025 in counterpart Korean Patent Appln. No. 10-2023-7009656.
Chinese Office Action dated Aug. 14, 2025 in counterpart Chinese Patent Appln. No. 202180053534.9.
Communication from Indian Patent Office issued Oct. 15, 2025 in counterpart Indian Patent Appln. No. 202317014455.
Korean Office Action dated Mar. 6, 2026 in counterpart Korean Patent Appln. No. 10-2023-7009656.

* cited by examiner

COMMUNICATION APPARATUS, CONTROL METHOD FOR COMMUNICATION APPARATUS, AND COMPUTER-READABLE STORAGE MEDIUM

CROSS-REFERENCE TO RELATED APPLICATIONS

This application is a Continuation of International Patent Application No. PCT/JP2021/029811, filed Aug. 13, 2021, which claims the benefit of Japanese Patent Application No. 2020-145853 filed Aug. 31, 2020, both of which are hereby incorporated by reference herein in their entirety.

BACKGROUND OF THE INVENTION

Field of the Invention

The present invention relates to a wireless communication technique.

Background Art

Along with the recent increase in a data amount to be communicated, communication techniques such as a wireless LAN (Local Area Network) have been developed. As the main communication standard of the wireless LAN, the IEEE (Institute of Electrical and Electronics Engineers) 802.11 standard series is known. The IEEE802.11 standard series includes IEEE802.11a/b/g/n/ac/ax standards. For example, in the IEEE802.11ax standard, a technique for not only implementing high peak throughput of 9.6 gigabits per sec (Gbps) at maximum but also improving the communication rate under congestion by using Orthogonal Frequency-Division Multiple Access (OFDMA) is standardized (see Japanese Patent Laid-Open No. 2018-050133).

As a succeeding standard that aims at further improving the throughput, the frequency use efficiently, and the latency of communication, Task Group called IEEE802.11be has been formed. In the IEEE802.11be standard, there has been examined a technique for allowing a plurality of access points (to be referred to as "APs" hereinafter) to operate in cooperation with each other to perform data communication with a station (to be referred to as an "STA" hereinafter), thereby implementing improvement of the communication rate and improvement of communication performance such as reduction of radio interference using beamforming.

Another example is a technique called cooperative beamforming. In this technique, if an AP transmits data to an STA belonging to a Basic Service Set (BSS), an antenna pattern in which the antenna gain in the direction of the STA is increased and the antenna gain in the direction of an STA belonging to the BSS of another AP is decreased is used. An antenna pattern is set among the plurality of APs based on environment information such as the position of the STA, and scheduling is performed, thereby making it possible to reduce interference among the BSSs.

Such communication technique in which the plurality of APs operate in cooperation with each other is called Multi-AP communication, and the plurality of APs are classified into one master AP that manages all the APs and slave APs that operate under the management of the master AP.

As one of procedures of transmitting data from an AP as a data transmission source to an STA in Multi-AP communication, a relay AP different from the transmission source AP receives data from the transmission source AP, and transfers the data to the STA. The transmission source AP will be referred to as a Transmitter AP hereinafter, the AP that relays and transfers data to the STA will be referred to as a Relay AP hereinafter, and the STA as the destination of the data will be referred to as a Receiver STA hereinafter.

In the IEEE802.11be standard, there has been examined a technique (multi-link communication) in which one AP establishes a plurality of links with one STA via a plurality of different frequency channels to execute communications.

In Multi-AP communication, if the Transmitter AP executes data communication with the Receiver STA via the Relay AP, reception confirmation (transmission of an acknowledgement (Ack)) is performed after data transmission between the Transmitter AP and the Relay AP and between the Relay AP and the Receiver STA. To perform reception confirmation, a Block Ack (BA) defined in the IEEE802.11 standard can mainly be used. At this time, the Transmitter AP can confirm by a BA that the Relay AP can receive data. However, the BA for confirming that the Receiver STA receives the data stops at the Relay AP. Therefore, the Transmitter AP cannot know a data unit that can be transmitted to the Receiver STA. The same problem may arise when the transmission source of the data is the STA (Transmitter STA) and the destination of the data via the Relay AP is the AP (Relay AP).

SUMMARY OF THE INVENTION

According to the present invention, in multi-AP communication, a data transmission source acquires a data reception confirmation in a data transmission destination.

A communication apparatus according to the present invention has the following arrangement. That is, there is provided a communication apparatus complying with an IEEE802.11 series standard, comprising a first reception unit configured to receive, from a first other communication apparatus, a data frame including data units and an indication of a sequence number assigned to at least one data unit of the data units, a first transmission unit configured to transmit, to a second other communication apparatus, a data frame including the sequence number and the at least one data unit, a second reception unit configured to receive, from the second other communication apparatus, a reception confirmation with respect to the data frame transmitted by the first transmission unit, and a second transmission unit configured to transmit, to the first other communication apparatus, information of the sequence number of the data unit received by the second other communication apparatus, which is included in the reception confirmation.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

101 transmits data to an STA 104 via APs 102 and 103 according to the first embodiment.

Figure 5:
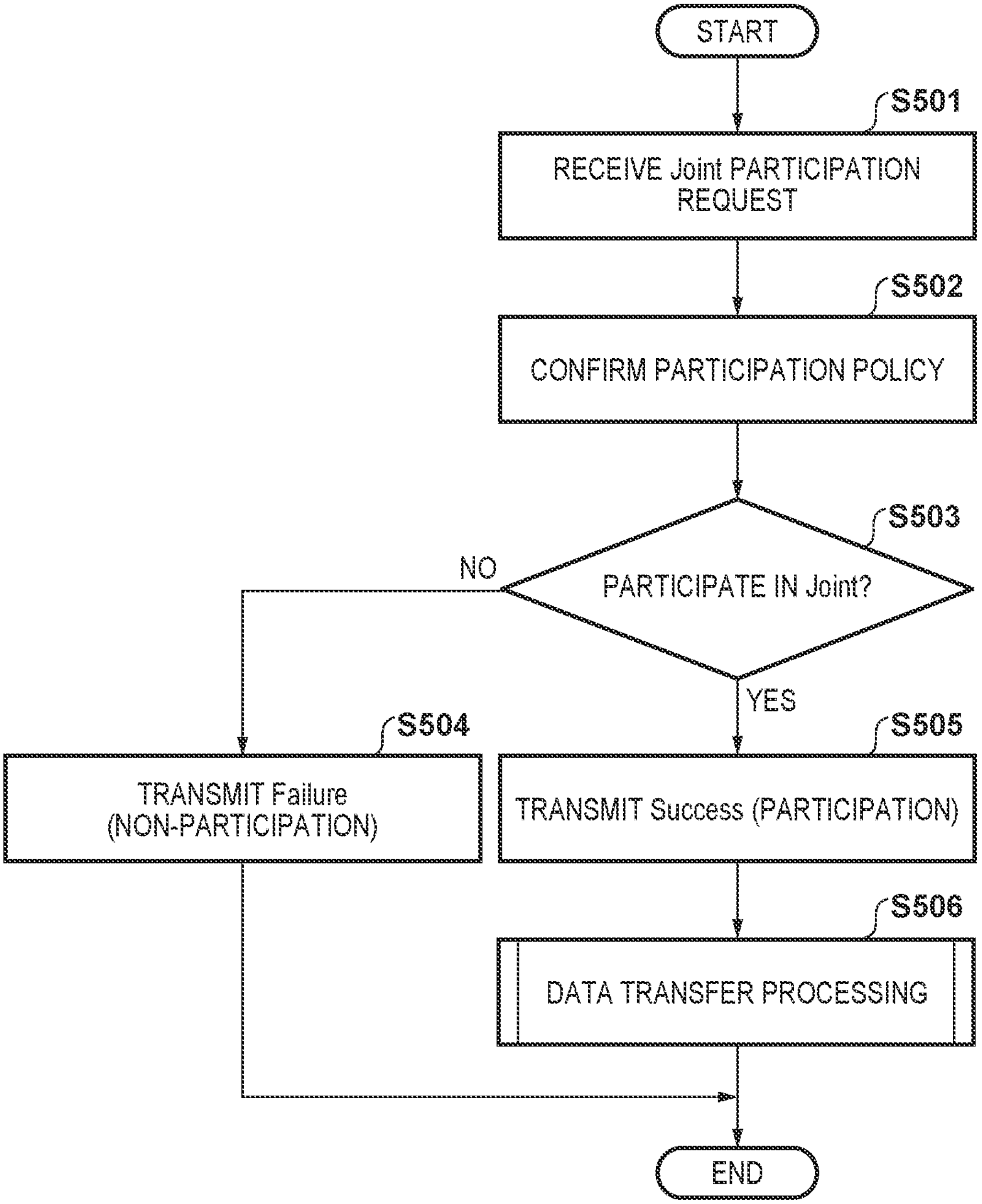

FIG. 5 is a flowchart illustrating processing executed when the APs 102 and 103 receive Joint from the AP 101A according to the first embodiment.

Figure 6A:
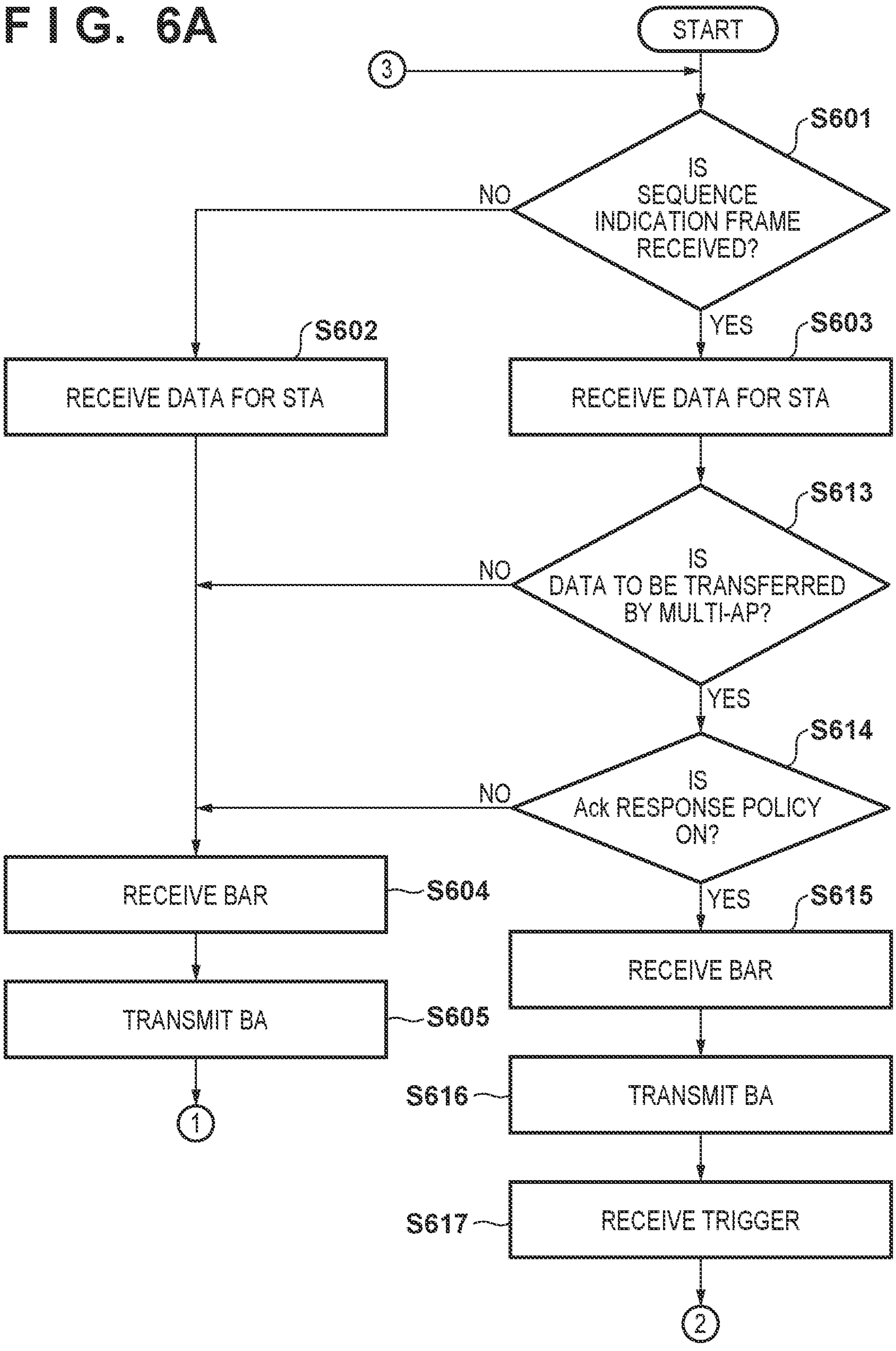

FIG. 6A is a flowchart illustrating processing when the APs 102 and 103 transmit the data to the STA 104 according to the first embodiment.

Figure 6B:
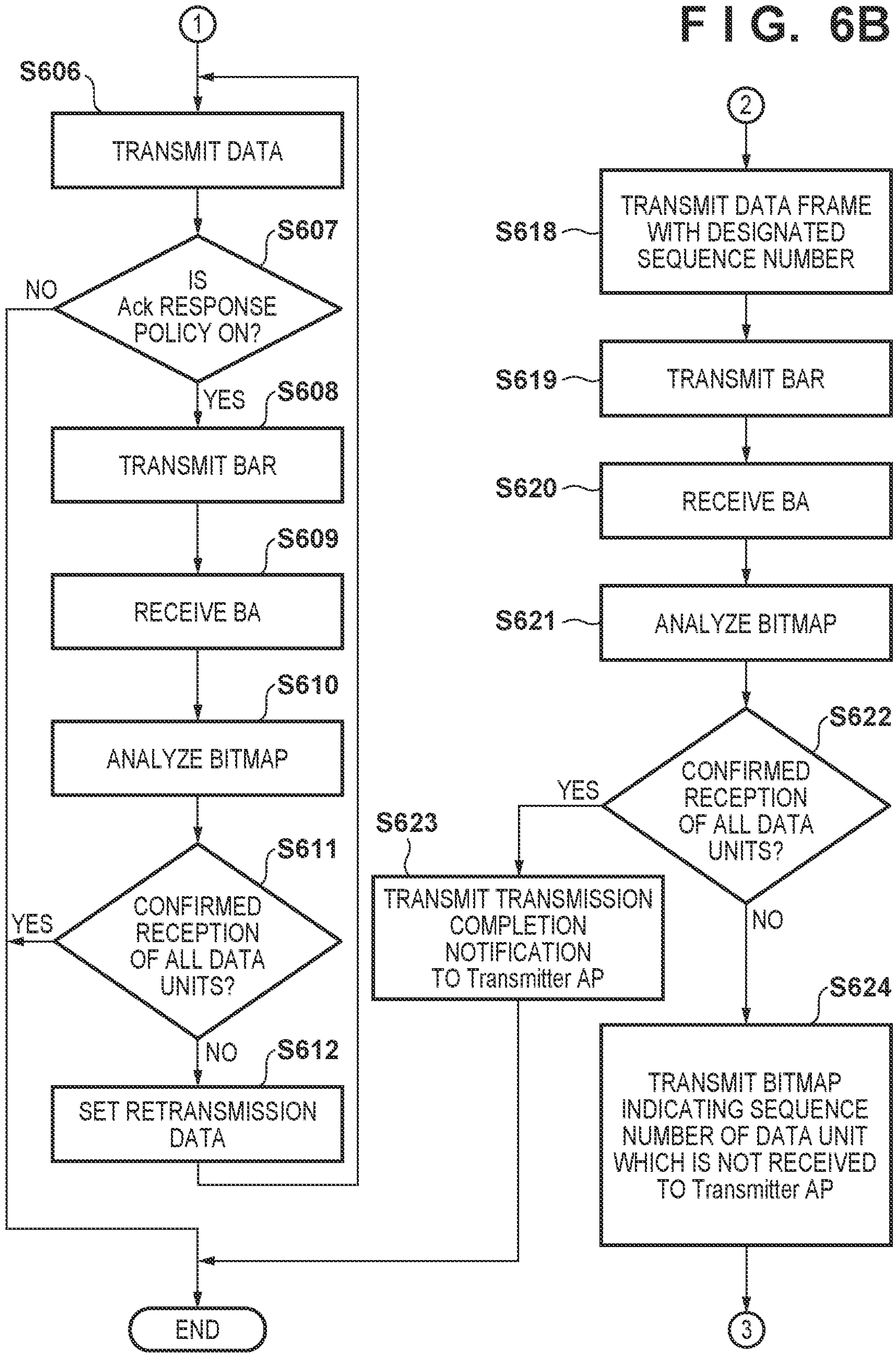

FIG. 6B is a flowchart illustrating the processing when the APs 102 and 103 transmit the data to the STA 104 according to the first embodiment.

Figure 7:
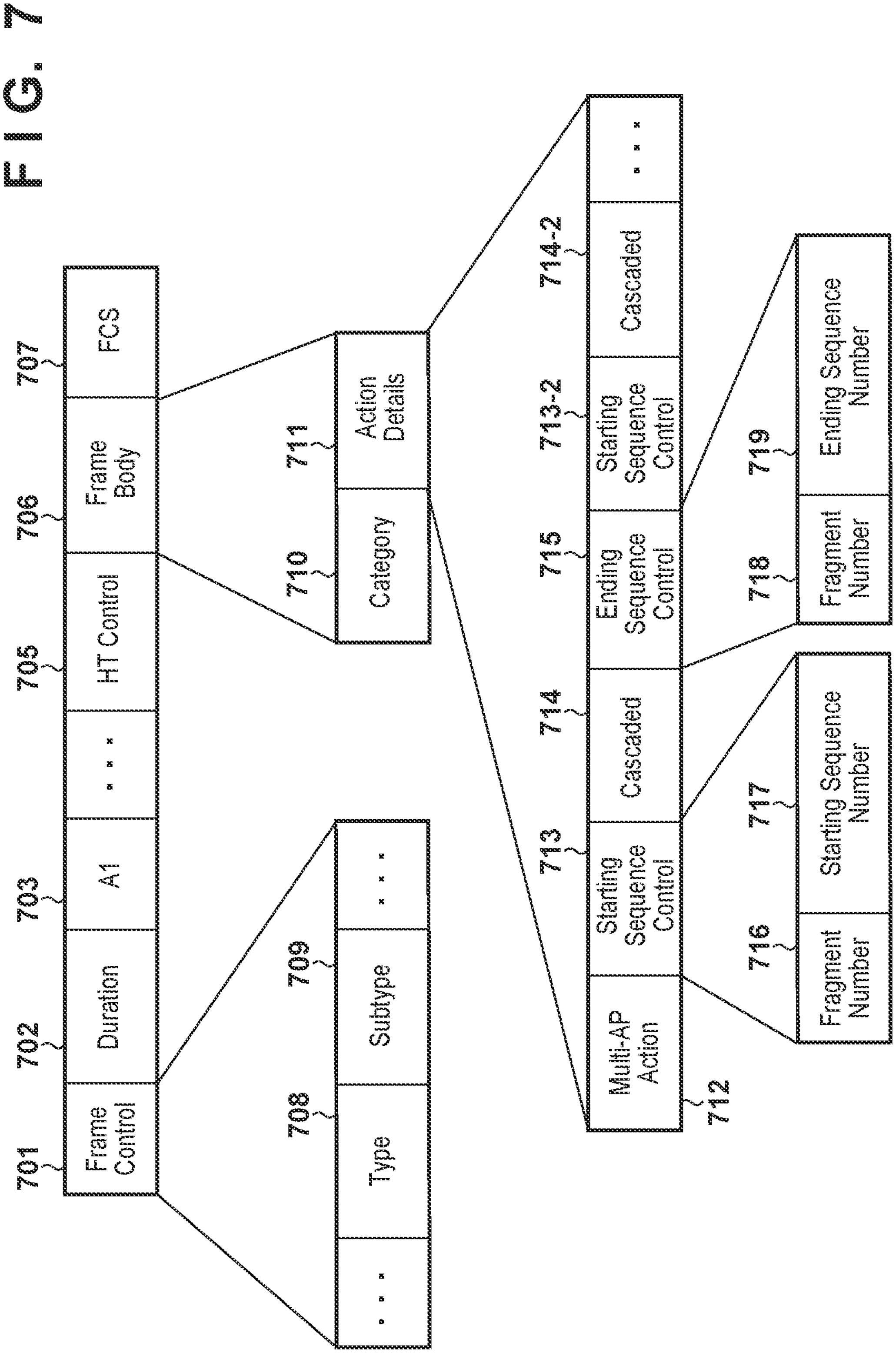

FIG. 7 is a view showing an example of a frame used by the AP 101 to instruct the APs 102 and 103 of a sequence number at the time of data transmission.

Figure 8:
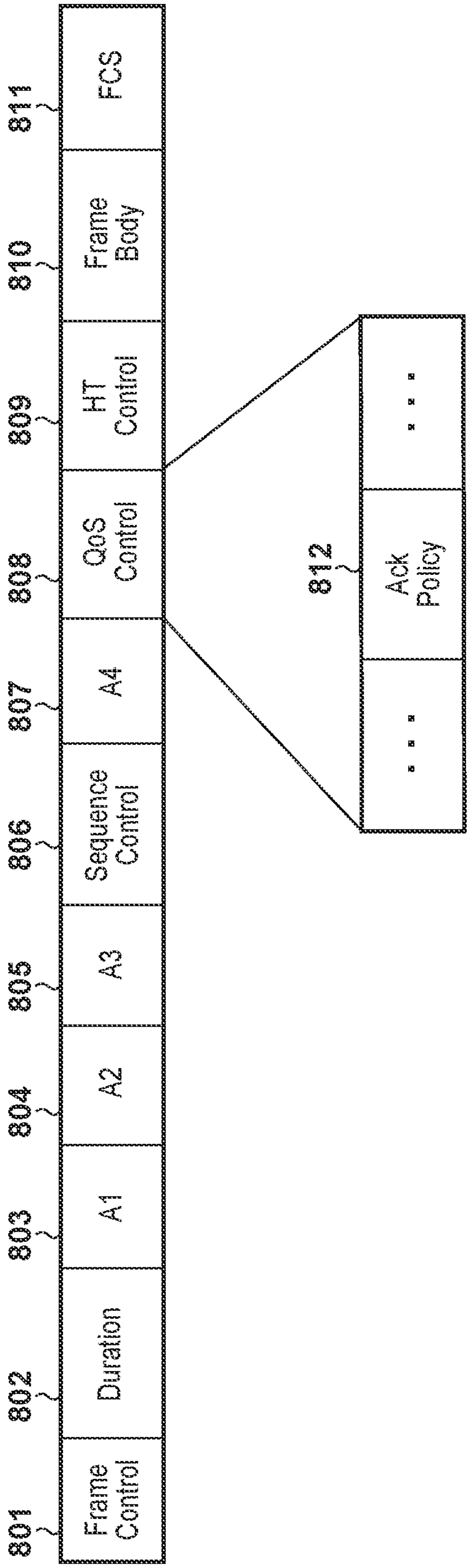

FIG. 8 is a view showing an example of a data frame transmitted by the AP 101/AP 102/AP 103.

Figure 9:
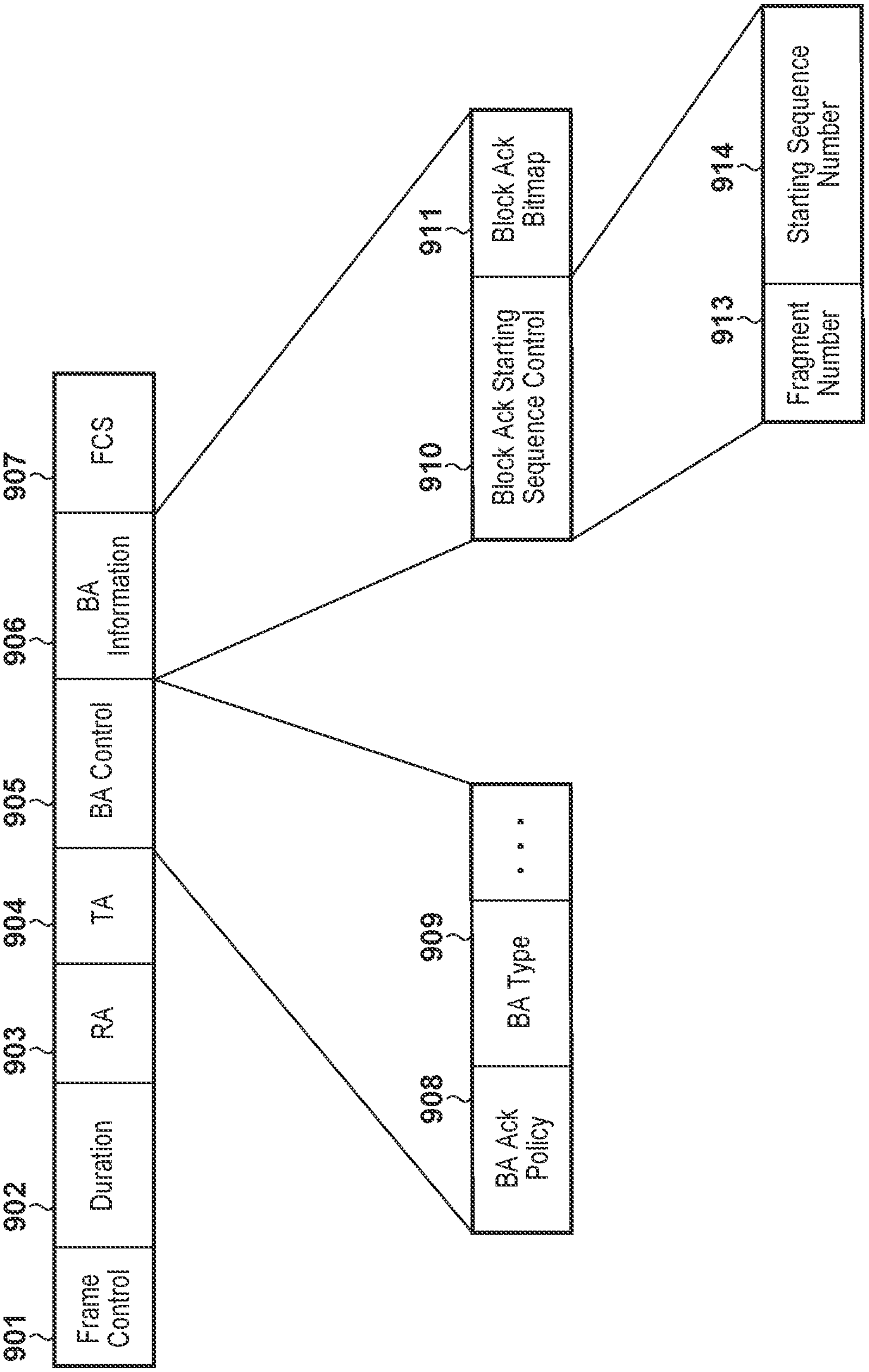

FIG. 9 is a view showing an example of a BA frame transmitted by the AP 102/AP 103/STA 104.

Figure 10:
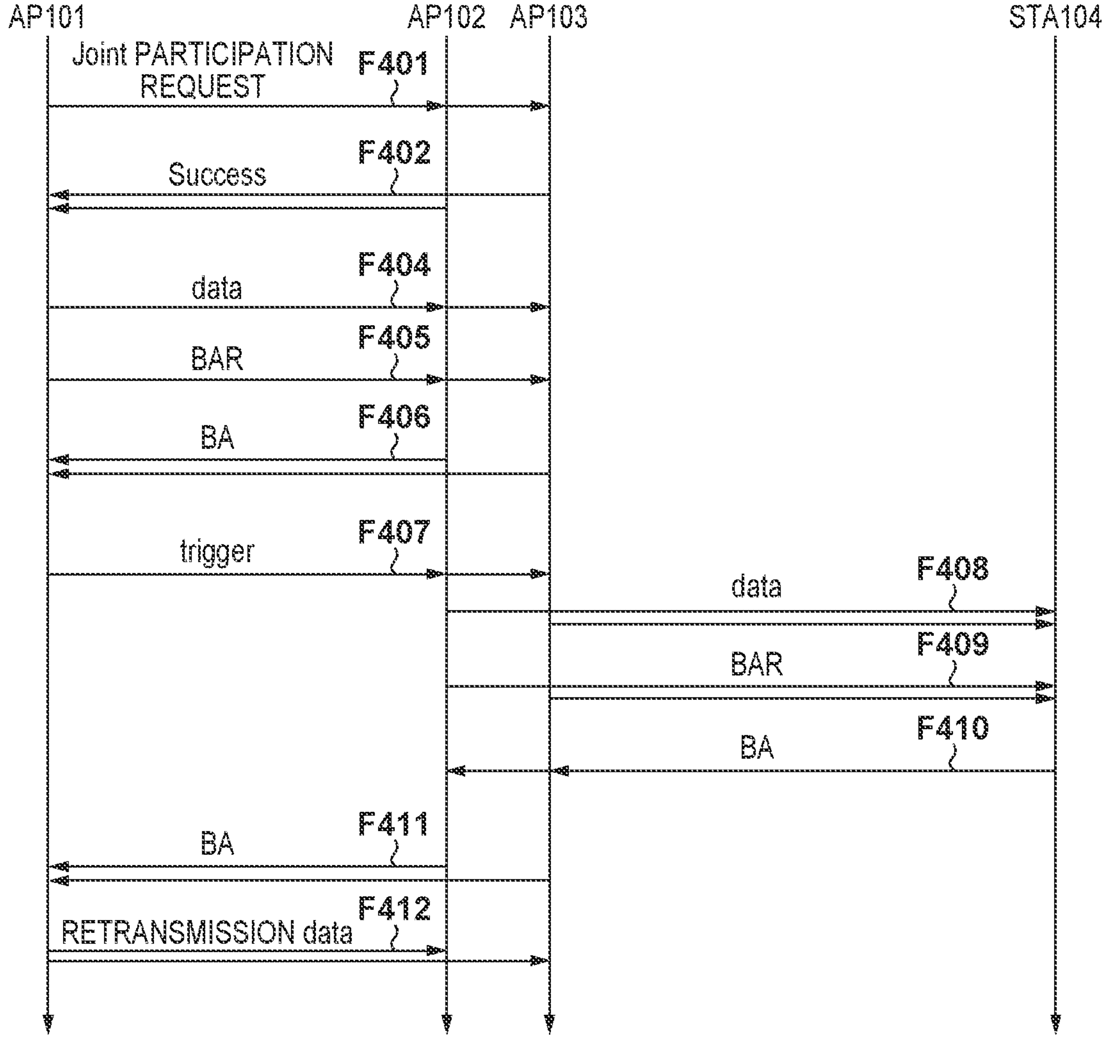

FIG. 10 is a sequence chart showing the procedure of the overall data transmission/reception processing when an AP 101 transmits data to an STA 104 via APs 102 and 103 according to the second embodiment.

Figure 11A:
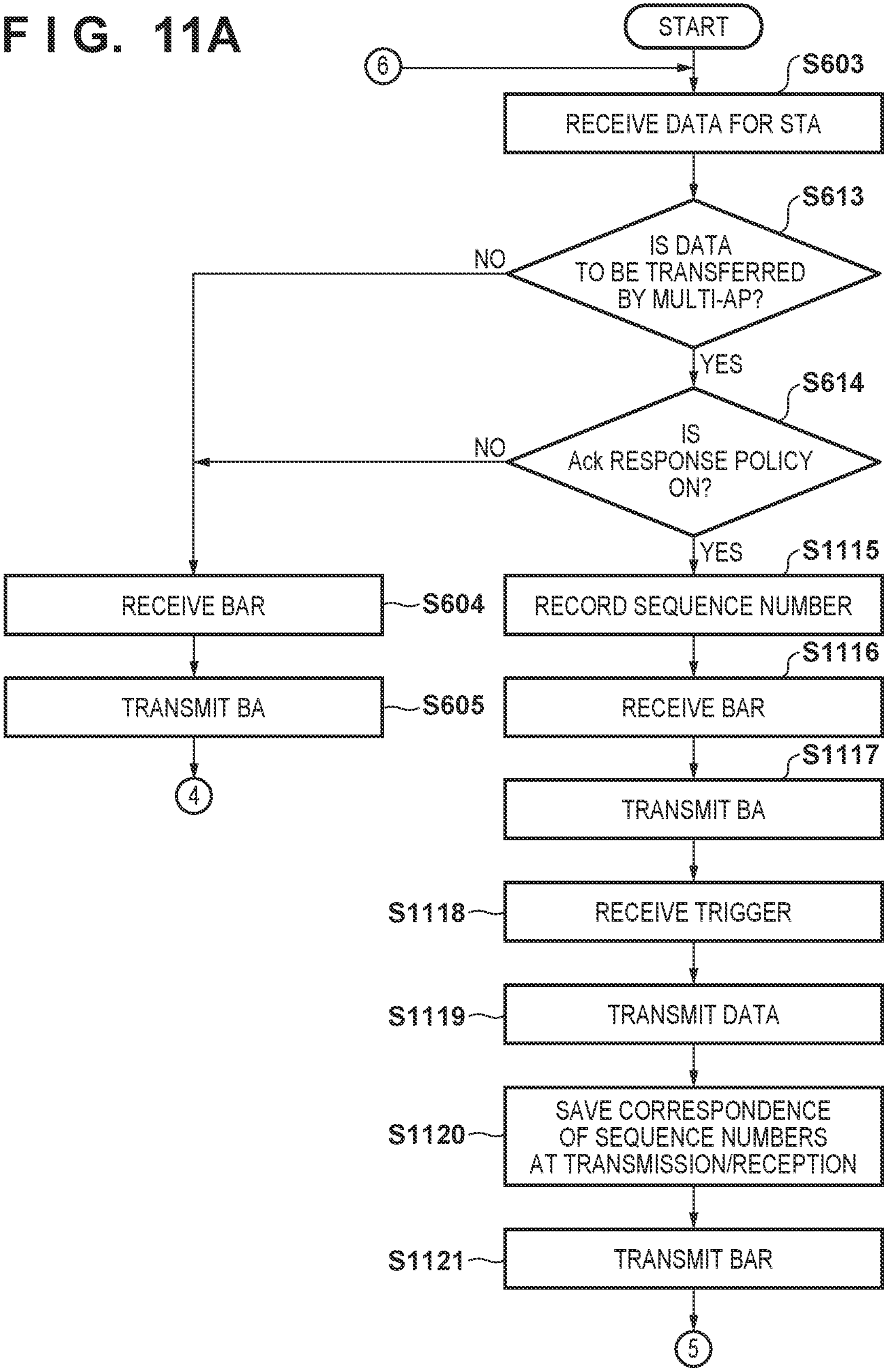

FIG. 11A is a flowchart illustrating processing when the APs 102 and 103 transmit the data to the STA 104 according to the second embodiment.

Figure 11B:
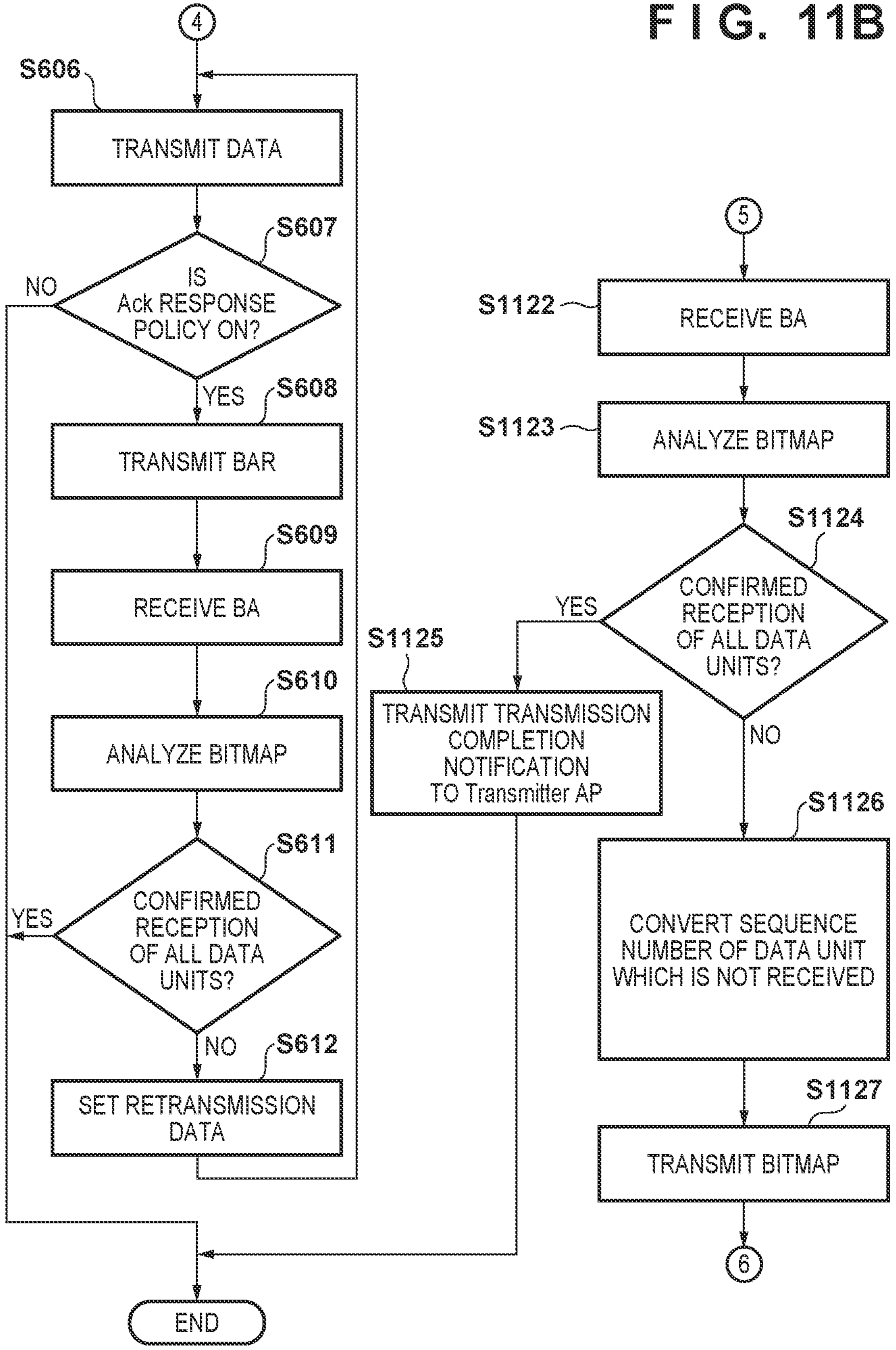

FIG. 11B is a flowchart illustrating the processing when the APs 102 and 103 transmit the data to the STA 104 according to the second embodiment.

Figure 12:
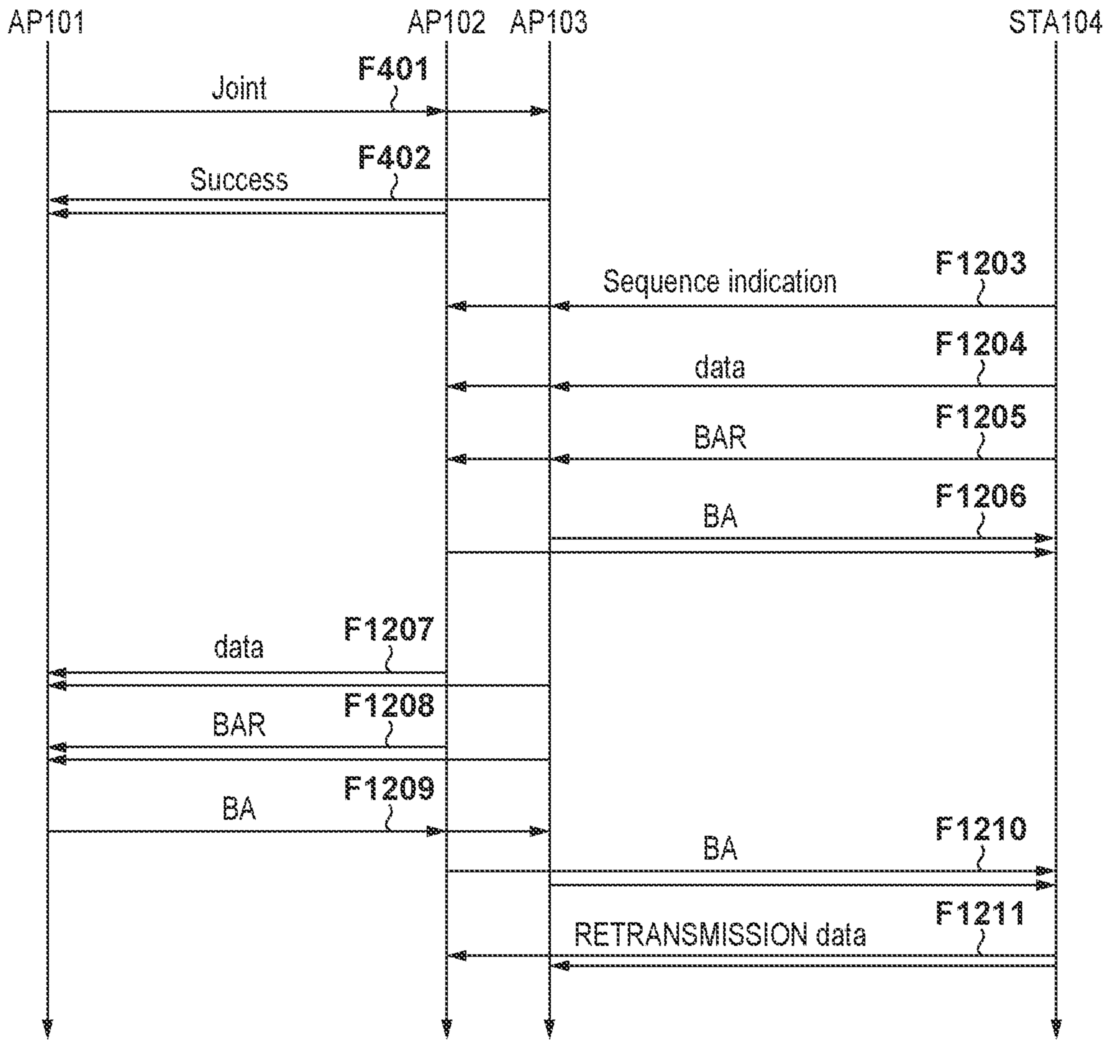

FIG. 12 is a sequence chart showing the procedure of the overall data transmission/reception processing when an STA 104 transmits data to an AP 101 via APs 102 and 103 according to the third embodiment.

Figure 13A:
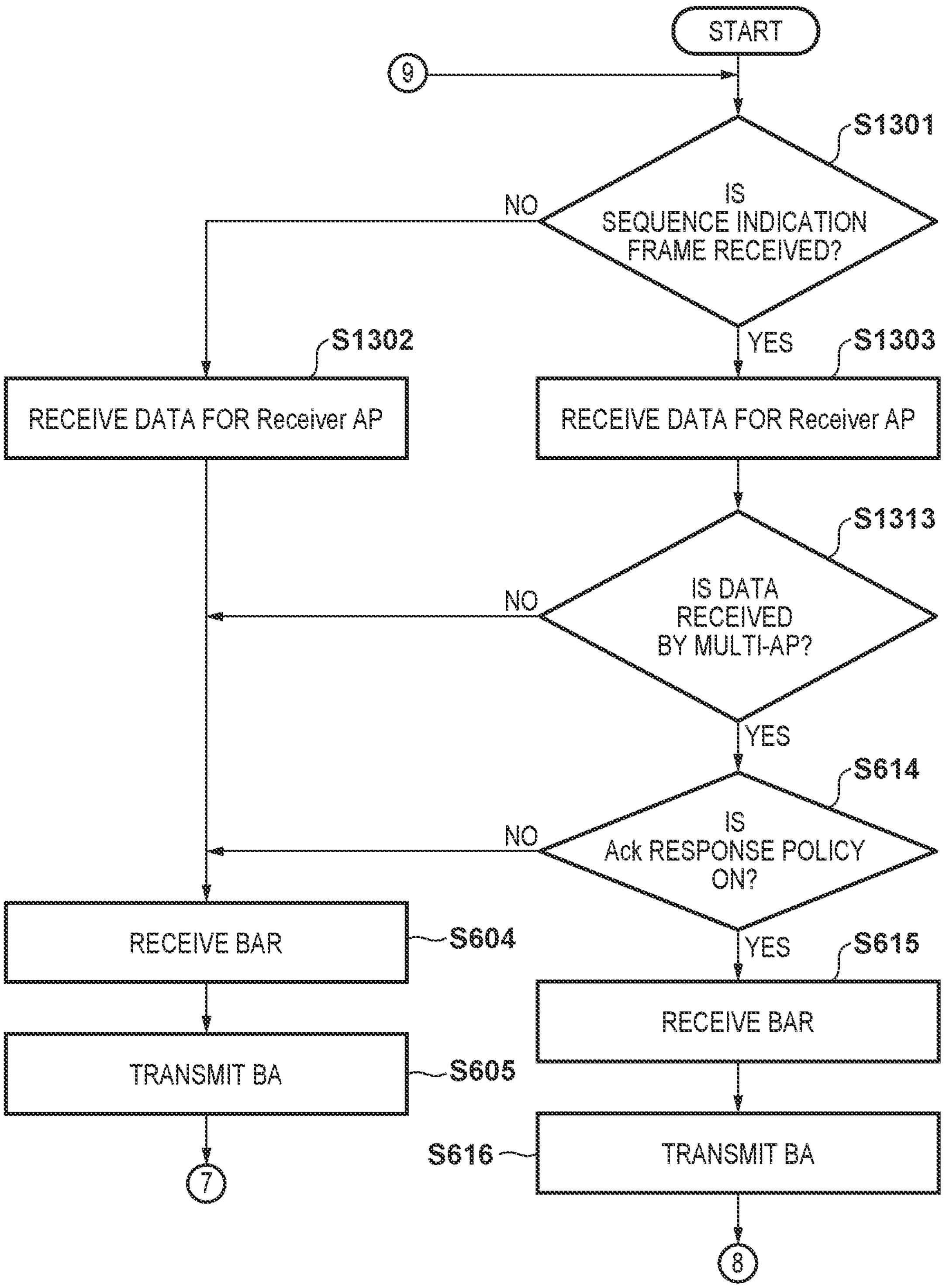

FIG. 13A is a flowchart illustrating processing when the APs 102 and 103 transmit the data to the AP 101 according to the third embodiment.

Figure 13B:
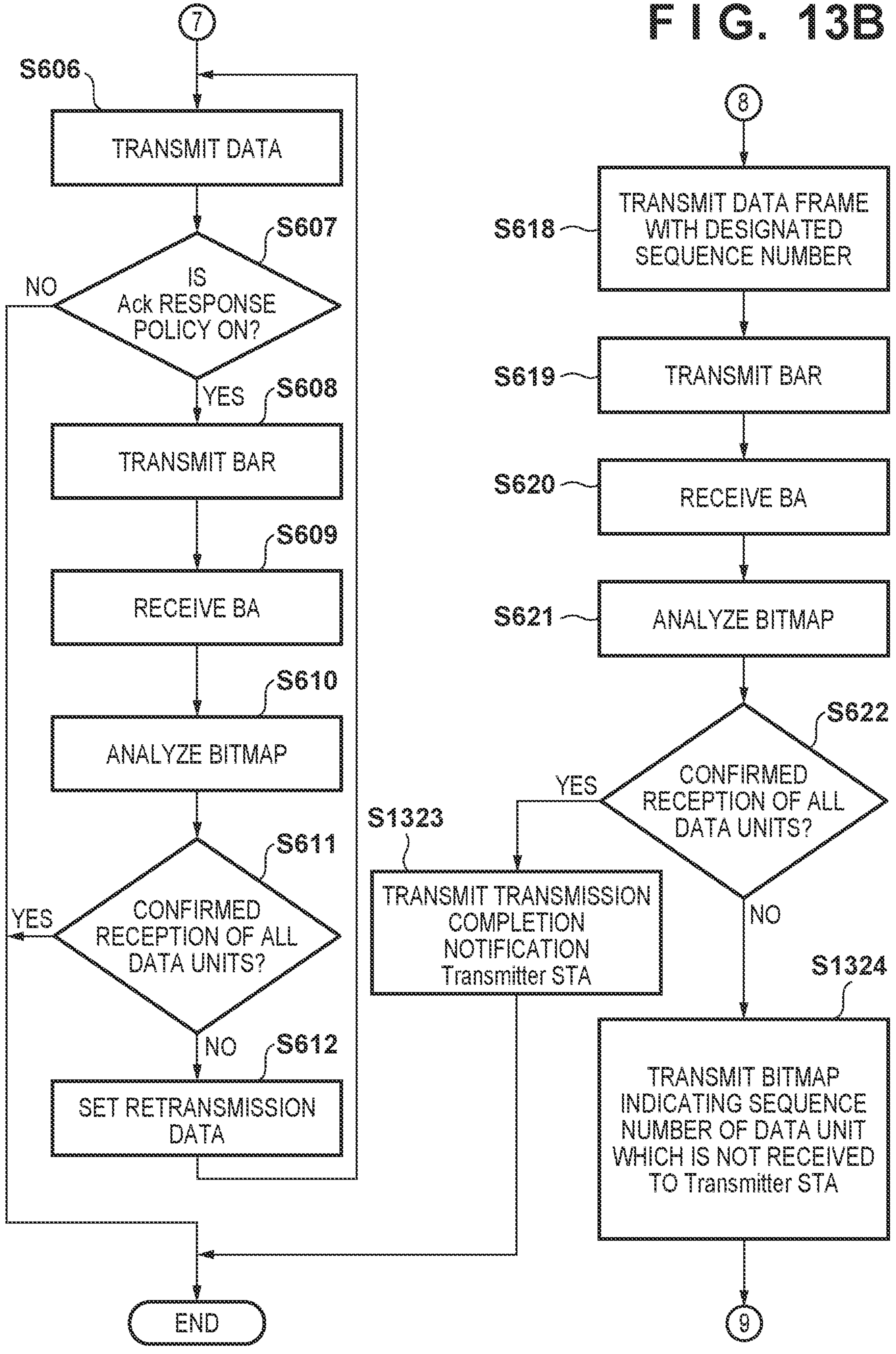

FIG. 13B is a flowchart illustrating the processing when the APs 102 and 103 transmit the data to the AP 101 according to the third embodiment.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Configuration of Wireless Communication System)

Figure 1:
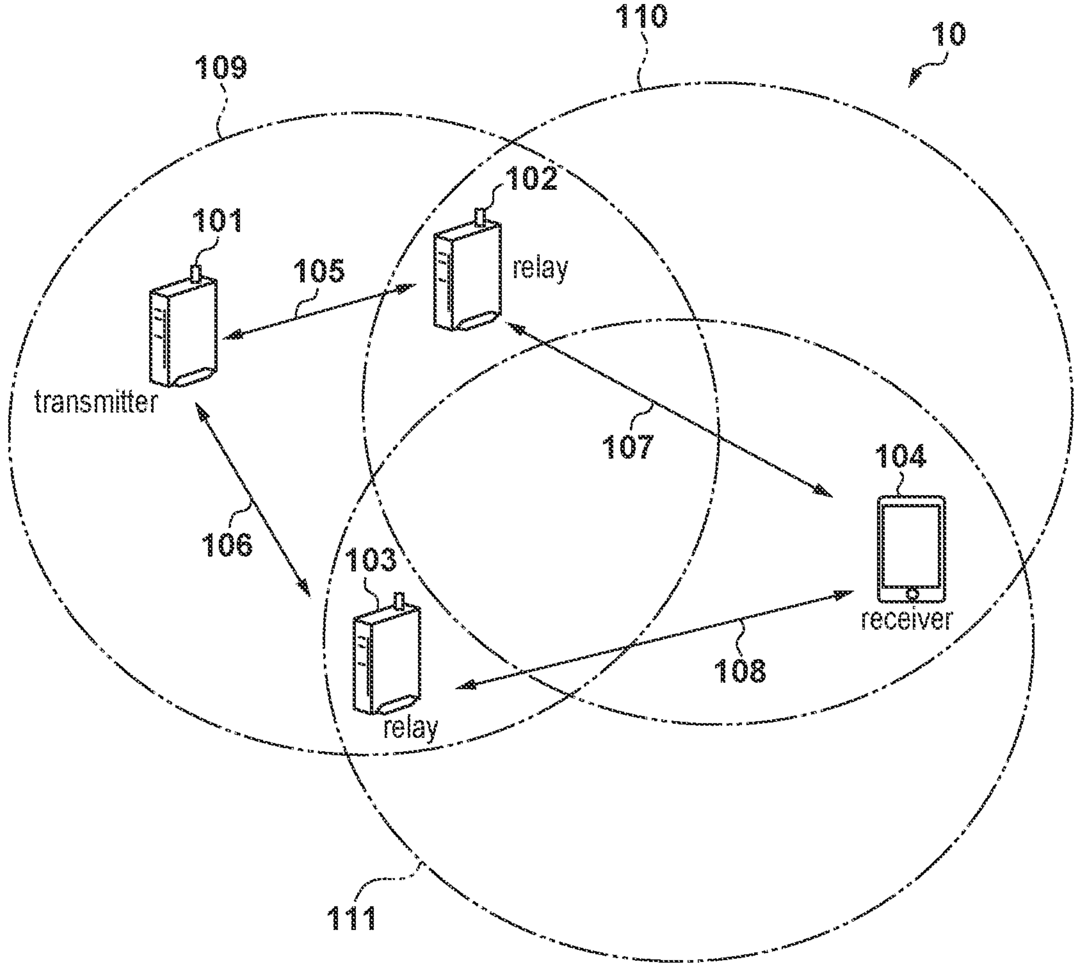
FIG. 1 is a view showing an example of the configuration of a network.

FIG. 1 is a view showing an example of the configuration of a wireless communication system. A wireless communication system 10 shown in FIG. 1 is formed by an STA (station/terminal apparatus) 104 and access points (APs) 101 to 103. The STA 104 is a communication apparatus having a role of participating in networks 110 and 111. The AP 101 is a communication apparatus having a role of creating a wireless network 109, the AP 102 is a communication apparatus having a role of creating the wireless network 110, and the AP 103 is a communication apparatus having a role of creating the wireless network 111. The AP 101 functions as a Transmitter AP (an AP as a data transmission source), and can communicate with the APs 102 and 103. Each of the APs 102 and 103 functions as a Relay AP (an AP that relays data transmission), and can communicate with the AP 101 and the STA 104. The STA 104 functions as a Receiver STA (an STA as a data transmission destination).

Each of the APs 101 to 103 and the STA 104 can execute wireless communication complying with the IEEE (Institute of Electrical and Electronics Engineers) 802.11be (EHT) standard. Each of the APs 101 to 103 and the STA 104 can execute communication at a frequency in each of the 2.4-, 5-, and 6-GHz bands. A frequency band used by each communication apparatus is not limited to them, and a different frequency band such as 60-GHz band may be used. Each of the APs 101 to 103 and the STA 104 can execute communication using 20-, 40-, 80-, 160-, and 320-MHz bandwidths. A bandwidth used by each communication apparatus is not limited to them, and different bandwidths such as 240- and 4-MHz bandwidths may be used.

Each of the APs 101 to 103 can implement multi-user (MU) communication of multiplexing signals of a plurality of users by executing Orthogonal Frequency Division Multiple Access (OFDMA) communication complying with the IEEE802.11be standard. In OFDMA communication, some (Resource Units (RUs)) of divided frequency bands are allocated to respective STAs not to overlap each other, and the carrier waves of the respective STAs are orthogonal to each other. Therefore, the AP can simultaneously communicate with the plurality of STAs in the defined bandwidth.

Note that each of the APs 101 to 103 and the STA 104 is assumed to comply with the IEEE802.11be standard. In addition to this, each of the APs 101 to 103 and the STA 104 may support a legacy standard defined before the IEEE802.11be standard. More specifically, each of the APs 101 to 103 and the STA 104 may support at least one of the IEEE802.11a/b/g/n/ac/ax standards. Furthermore, in addition to the IEEE802.11 series standards, each of the APs 101 to 103 and the STA 104 may support another communication standard such as Bluetooth®, NFC, UWB, ZigBee, or MBOA. Note that NFC is an abbreviation for Near Field Communication. Furthermore, UWB is an abbreviation for Ultra Wide Band, and MBOA is an abbreviation for Multi Band OFDM Alliance. UWB includes wireless USB, wireless 1394, and WiNET. In addition, each of the APs 101 to 103 and the STA 104 may support a communication standard of wired communication such as a wired LAN.

Practical examples of the APs 101 to 103 are a wireless LAN router, a personal computer (PC), and the like, but are not limited to them. Each of the APs 101 to 103 may be an information processing apparatus such as a radio chip that can execute wireless communication complying with the IEEE802.11be standard. Practical examples of the STA 104 are a camera, a tablet, a smartphone, a PC, a mobile phone, a video camera, a headset, and the like, but are not limited to them. The STA 104 may be an information processing apparatus such as a radio chip that can execute wireless communication complying with the IEEE802.11be standard.

In this embodiment, assume that if each of the APs 101 to 103 creates a plurality of networks, the BSSIDs of the networks are different from each other. Note that BSSID is an abbreviation for Basic Service Set Identifier, and is an identifier for identifying a network. Each of the APs 101 to 103 sets a common SSID as an SSID indicated in each network. Note that SSID is an abbreviation for Service Set Identifier, and is an identifier for identifying an access point. In this embodiment, even if each of the APs 101 to 103 establishes a plurality of connections, one SSID is commonly used.

As described above, each of the APs 101 to 103 and the STA 104 can execute communication using 20-, 40-, 80-, 160-, and 320-MHz bandwidths. In the IEEE802.11 series standards, the bandwidth of each frequency channel is defined as 20 MHz. A bandwidth of 40 MHz or more can be used in one frequency channel by bonding adjacent frequency channels. For example, the AP 102 can establish, with the STA 104, a link 107 via the first frequency channel in the 2.4-GHz band to execute communication. Along with this, the STA 104 can establish a link 108 with the AP 103 via the second frequency channel in the 5-GHz band to execute communication. In this case, the AP 104 maintains the link 108 via the second frequency channel while maintaining the link 107 via the first frequency channel. In the background, the APs 101 and 102 communicate with each other by establishing a link 105 via the third frequency channel in the 6-GHz band, and the APs 101 and 103 communicate with each other by establishing a link 106 via a frequency channel in the 6-GHz band. With this arrangement, the AP 101 can execute data communication with the STA 104 via the APs 102 and 103. Thus, the STA 104 can establish links with the APs 102 and 103 via the plurality of frequency channels, thereby improving throughput in communication with the AP 101.

In this embodiment, as an example, the link 105 is a 320-MHz connection using channel 39 in the 6-GHz band, and the link 106 is a 320-MHz connection using channel 113 in the 6-GHz band. Furthermore, the link 107 is a 20-MHz connection using channel 6 in the 2.4-GHz band, and the link 108 is an 80-MHz connection using channel 36 in the 5-GHz band.

Note that a plurality of links (multi-link) may be established between communication apparatuses. If multi-link communication is performed, the AP 102 and the STA 104 can divide one data and communicate the divided data via the plurality of links. As a multi-link arrangement, for example, the AP 102 and the STA 104 may establish the second link in the 6-GHz band in addition to the link 107 in the 2.4-GHz band. Alternatively, the AP 102 and the STA 104 may establish a plurality of links via a plurality of different channels included in the same frequency band. For example, a link using channel 6 in the 2.4-GHz band may be established as the first link. In addition to this, a link using channel 1 in the 2.4-GHz band may be established as the second link. Note that links of the same frequency band and links of different frequency bands may be mixed. For example, the AP 102 and the STA 104 may establish a link using channel 1 in the 2.4-GHz band and a link using channel 149 in the 5-GHz band in addition to the link 107 using channel 6 in the 2.4-GHz band. If the AP 102 establishes the plurality of connections of different frequencies with the STA 104, even if a given band is congested, the AP 102 can establish communication with STA 104 in another band, thereby preventing degradation of throughput in communication with the STA 104.

Note that the wireless communication system 10 shown in FIG. 1 is formed by three APs and one STA but the number of APs, the number of STAs, and their arrangement positions are not limited to this example. For example, one Relay AP connected to the AP 101 and the STA 104 may be added to the wireless communication system 10. In this case, one Relay AP is additionally connected to the AP 101, and can also be connected to the STA 104. At this time, the frequency band of each established link, the number of links, and a frequency range are not particularly limited. By adding a Relay AP, it is possible to continue communication via the added Relay AP even if a congested frequency is used for communication with the AP 101 or the physical distance increases due to movement of the STA 104. As a result, it is possible to prevent degradation of throughput in communication between the AP 101 and the STA 104 via the Relay AP.

As another example, the APs 101 and 102 may be the same AP. In this case, there is no link 105. The link 106 is established between the APs 101 and 103, the link 107 is established between the AP 101 and the STA 104, and the link 108 is established between the AP 103 and the STA 104. When the AP 101 establishes, with the STA 104, communication via the links 106 and 108 in addition to communication via the link 107, it is possible to increase the communication amount per unit time, as compared with only communication via the link 107. As a result, high throughput can be implemented. Alternatively, even if communication via the link 107 is congested, communication via the links 106 and 108 can be executed, thereby executing communication with a low delay.

As still another example, communication in the background between the APs may be executed via a wire. In this case, even if a wireless communication environment is not rich, the plurality of APs can cooperate with each other to increase the communication amount per unit time, thereby implementing high throughput. Alternatively, since radio resources with which it is easy to execute communication can be used instantaneously, it is possible to execute communication with a low delay.

A plurality of STAs may be arranged in the wireless communication system 10. For example, an STA may be prepared in addition to the Receiver STA 104, and a link may be established between the AP 103 and the added STA. In this case, the link 108 need not be established. This enables the AP 101 to instruct each of the APs 102 and 103 of a use frequency band and a timing. As a result, it is possible to suppress radio interference that can occur between the APs 102 and 103, thereby executing communication between the AP 102/AP 103 and the STA without delay. Alternatively, an STA that dedicatedly establishes a link with the AP 102, an STA that dedicatedly establishes a link with the AP 103, and an STA that collects received data may be separately arranged as the STA 104. Thus, even if the function of each STA for executing communication as an STA is limited, the same effect as the above-described reason can be obtained, and it is thus possible to execute communication with a low delay or high throughput in the entire system.

The APs 101 to 103 and the STA 104 may be able to execute Multiple-Input and Multiple-Output (MIMO) communication. In this case, each communication apparatus includes a plurality of antennas, and one communication apparatus uses the same frequency channel to transmit different signals from the respective antennas. The reception-side apparatus simultaneously receives all the signals arriving from a plurality of streams using the plurality of antennas, separates the signals of the streams, and decodes them. In this way, each communication apparatus can communicate more data during the same time by executing MIMO communication, as compared with a case in which no MIMO communication is executed. Furthermore, when performing multi-link communication, each communication apparatus may execute MIMO communication in some of the links.

(Arrangement of Communication Apparatus (Each of AP and STA))

Figure 2:
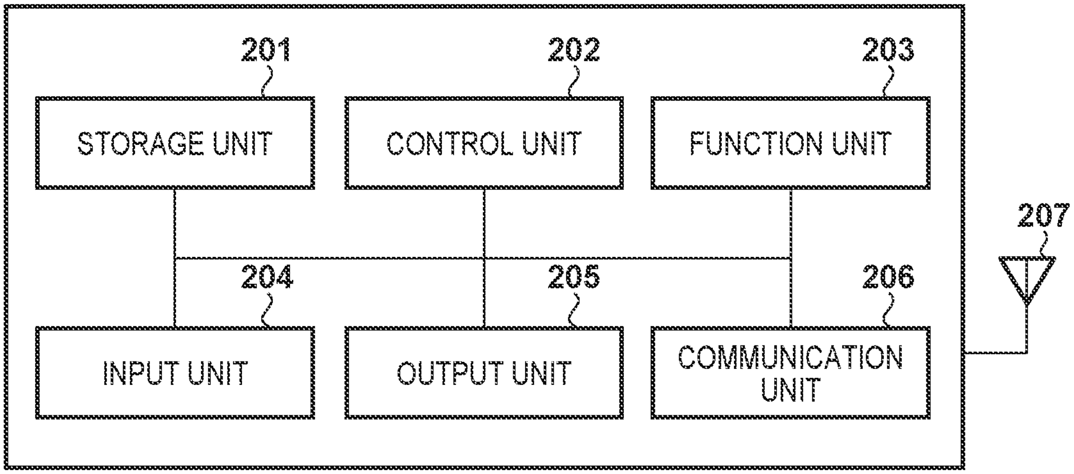
FIG. 2 is a block diagram showing an example of the hardware arrangement of a communication apparatus.

FIG. 2 shows an example of the hardware arrangement of the AP 102 according to this embodiment. Note that each of the APs 101 and 103 also has the same arrangement. The AP 102 includes a storage unit 201, a control unit 202, a function unit 203, an input unit 204, an output unit 205, a communication unit 206, and an antenna 207.

The storage unit 201 is formed by one or more memories such as a ROM and a RAM, and stores computer programs configured to perform various kinds of operations to be described later and various kinds of information such as communication parameters for wireless communication. ROM is an abbreviation for Read Only Memory, and RAM is an abbreviation for Random Access Memory. Note that as the storage unit 201, not only a memory such as a ROM or a RAM but also a storage medium such as a flexible disk, a hard disk, an optical disk, a magnetooptical disk, a CD-ROM, a CD-R, a magnetic tape, a nonvolatile memory card, or a DVD may be used. The storage unit 201 may include a plurality of memories.

The control unit 202 is formed by, for example, one or more processors such as a CPU and an MPU, and executes computer programs stored in the storage unit 201, thereby controlling the whole AP 102. Note that the control unit 202 may control the whole AP 102 by cooperation of the computer programs stored in the storage unit 201 and an Operating System (OS). The control unit 202 generates data and signals (radio frames) to be transmitted in communication with another communication apparatus. Note that CPU is an abbreviation for Central Processing Unit, and MPU is an abbreviation for Micro Processing Unit. The control unit 202 may include a plurality of processors such as a multi-core processor, and control the whole AP 102 by the plurality of processors.

Furthermore, the control unit 202 controls the function unit 203 and executes wireless communication and predetermined processing such as image capturing, printing, or projection. The function unit 203 is hardware for the AP 102 to execute predetermined processing.

The input unit 204 accepts various kinds of operations from the user. The output unit 205 performs various kinds of outputs to the user via a monitor screen and a loudspeaker. Here, the output by the output unit 205 may include display on the monitor screen, audio output by the loudspeaker, and vibration output. Note that both the input unit 204 and the output unit 205 may be implemented by one module, like a touch panel. Note that each of the input unit 204 and the output unit 205 may be arranged separately, or integrally with the AP 102.

The communication unit 206 controls wireless communication complying with the IEEE802.11be standard. The communication unit 206 may control wireless communication complying with another IEEE802.11 series standard in addition to the IEEE802.11be standard, and control wired communication such as a wired LAN. The communication unit 206 controls the antenna 207, and transmits/receives signals for wireless communication, which have been generated by the control unit 202.

Note that if the AP 102 supports the NFC standard or Bluetooth standard in addition to the IEEE802.11be standard, it may control wireless communication complying with these communication standards. If the AP 102 can execute wireless communication complying with each of a plurality of communication standards, it may include the communication unit and the antenna supporting each communication standard. The AP 102 communicates data such as image data, document data, or video data with STA 104 via the communication unit 206. Note that the antenna 207 may be arranged separately from the communication unit 206 or may be configured as a module integrated with the communication unit 206.

The antennas 207 is an antenna that allows communication in the 2.4-, 5-, and 6-GHz bands. The AP 102 includes one antenna in this embodiment but may include a plurality of antennas. Alternatively, the AP 102 may include antennas different for the respective frequency bands. If the AP 102 includes a plurality of antennas, it may include the communication unit 206 corresponding to each antenna. The antenna 207 may be configured to execute MIMO communication.

The STA 104 has the same arrangement as that shown in FIG. 2. The communication partner can be at least one of the APs 101 to 103.

Figure 3:
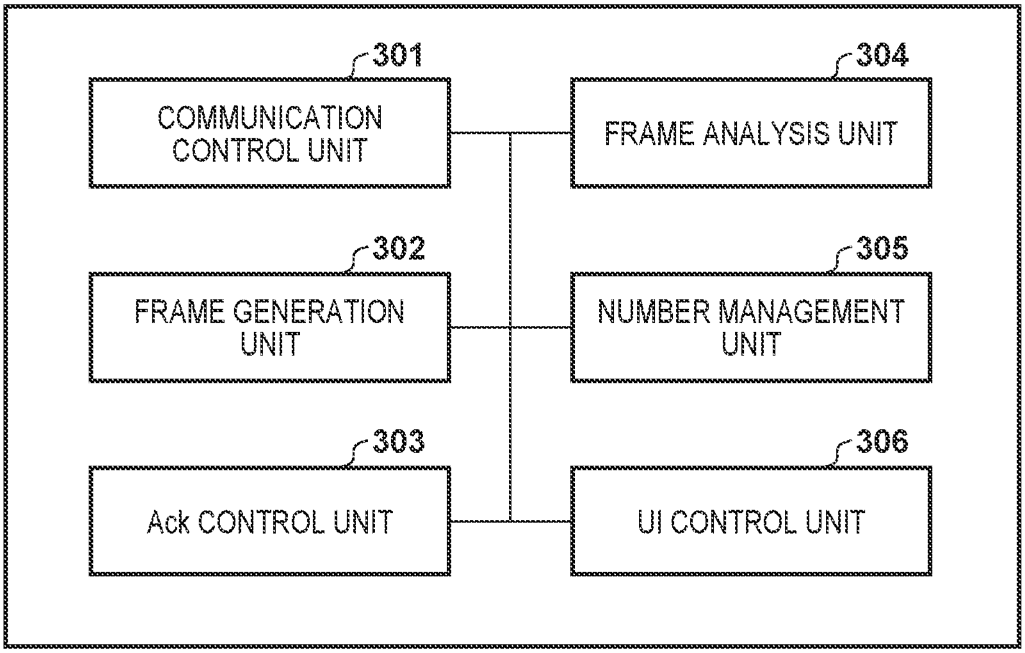
FIG. 3 is a block diagram showing an example of the functional arrangement of the communication apparatus.

FIG. 3 shows an example of the functional arrangement of the AP 102 according to this embodiment. Note that each of the APs 101 and 103 and the STA 104 has the same arrangement. The AP 102 includes a communication control unit 301, a frame generation unit 302, an Ack control unit 303, a frame analysis unit 304, a number management unit 305, and a UI control unit 306.

The communication control unit 301 performs communication control via the communication unit 206 (FIG. 2) via a wire or wirelessly. For example, the communication control unit 301 executes wireless LAN communication control based on a frame generated by the frame generation unit 302 in accordance with the IEEE802.11 standard series. Note that the number of communication control units 301 is not limited to one, and may be two, or three or more.

The frame generation unit 302 generates various kinds of control frames and data frames to be transmitted by the communication control unit 301. The data frame can be generated by a data unit (units), predetermined meta information, and the like. Contents stored in the frame generated by the frame generation unit 302 may be restricted by settings saved in the storage unit 201 (FIG. 2). The contents may be changed by user settings via the UI control unit 306. Information of the generated frame is transmitted to the communication partner via the communication control unit 301.

The Ack control unit 303 controls/confirms a communication method concerning an Ack (acknowledgement) used with the communication partner. For example, the Ack control unit 303 controls/confirms whether to use a BA for returning an ACK with respect to a plurality of frames or a BA Request (BAR). For example, the Ack control unit 303 can confirm whether to use an Ack/BA, by a value of an Ack Policy subfield (an Ack Policy subfield 812 in FIG. 8) in a transmitted or received data frame.

The frame analysis unit 304 analyzes the frame received by the communication control unit 301. In addition, the frame analysis unit 304 acquires necessary information by the analysis, and stores it in the storage unit 201, as necessary. For example, the frame analysis unit 304 stores, in the storage unit 201, information such as the data units included in the data frame received by the communication control unit 301. If the communication control unit 301 receives a reception confirmation frame after transmitting the data frame, the frame analysis unit 304 analyzes the reception confirmation, and detects a data unit that has arrived at the communication partner (a data unit that has been received by the communication partner). If it is detected that there is a data unit that has not arrived at the communication partner, the frame analysis unit 304 selects the corresponding data unit from the transmitted data units stored in the storage unit 201. Then, the frame analysis unit 304 sends the selected data unit to the frame generation unit 302 together with metadata information necessary to generate a data frame. If the communication control unit 301 receives information used as a trigger to transfer data, the frame analysis unit 304 extracts the data unit (units) stored in the storage unit 201, and sends the data unit (units) to the frame generation unit 302 together with metadata information necessary to generate a data frame.

The number management unit 305 generates a unique sequence number (a sequence number of the second type) that can be different from a sequence number (a sequence number of the first type) assigned to the received data unit, and assigns the generated sequence number to the received data unit. Furthermore, the number management unit 305 stores the correspondence between the sequence number of the first type and the sequence number of the second type in the storage unit 201, and manages it. Note that a communication apparatus other than a Relay AP need not include the number management unit 305.

The UI control unit 306 controls information input by the user via the input unit 204 (FIG. 2), and controls information output via the output unit 205 (FIG. 2).

Some embodiments will be described below based on the above-described configuration of the wireless communication system and the arrangement of the AP and STA.

First Embodiment

In this embodiment, an AP 101 functions as a Transmitter AP. Each of APs 102 and 103 functions as a Relay AP, and communicates with an STA 104 by an instruction from the AP 101. This embodiment will describe a case in which the AP 101 transmits data to the STA 104 via the AP 102/AP 103.

Figure 4:
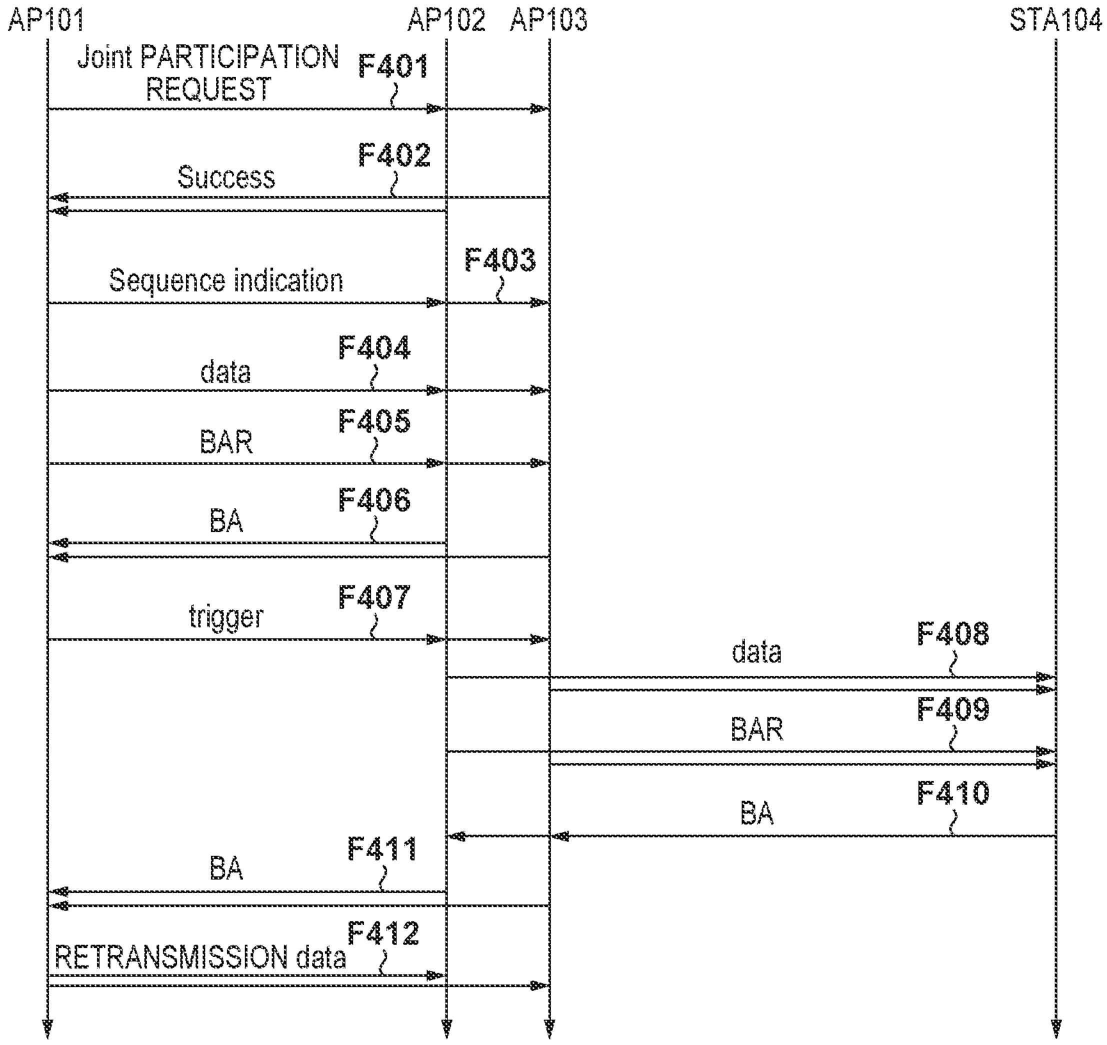
FIG. 4 is a sequence chart showing the procedure of the overall data transmission/reception processing when an AP

FIG. 4 is a sequence chart showing the procedure of the overall data transmission/reception processing when the AP 101 transmits data to the STA 104 via the AP 102/AP 103 according to this embodiment. This processing starts when there is data to be transmitted from the AP 101 to the STA 104. Note that this processing may start at the time of connection between the AP 101 and the AP 102/AP 103 and at the time of connection between the AP 102/AP 103 and the STA 104, and may start from F403 when transmitting data.

First, the AP 101 transmits, to a nearby AP, a request to participate in Joint transmission (to be referred to as a Joint participation request hereinafter) as a request for cooperation about Joint transmission as multi-AP (AP-coordinated) data transmission to the STA 104 (F401). This request may include an identifier having a meaning of returning a response when a nearby AP having the same SSID receives the request. Processing when each of the APs 102 and 103 receives the Joint participation request will be described later with reference to FIG. 5. In the example shown in FIG. 4, each of the APs 102 and 103 decides to participate in Joint transmission, and transmits a response in which Success is set in a Status Code to mean that the AP provides cooperation in data transmission (F402).

Upon receiving the response indicating Success from the nearby AP (that is, each of the APs 102 and 103) (F402), the AP 101 forms, based on the response, a group for data transmission in cooperation with the nearby AP. The response from the nearby AP may include various kinds of information in addition to Success in the Status Code. For example, the response may include pieces of information such as a usable channel, multi-link communication possibility, BSSID information, the received signal strength indicator (RSSI) of the AP 101 received by each slave AP (that is, each of the APs 102 and 103), the signal-to-noise ratio (SNR), the IP address, the MAC address, the values of HT, VHT, HE, and EHT capabilities, the transmission rate of transmission/reception data, the allowable maximum packet size, the maximum number of connectable STAs, the number of currently connected STAs, the kinds of security standards supported by the currently connected STA or AP, a channel used by the currently connected STA, and the transmission/reception rates of data from the minimum rate to the maximum rate.

At this time, the Transmitter AP (in this example, the AP 101) issues an ID for identifying a Relay AP. This ID is handled as an ID equivalent to an AID (association ID) assigned to a currently connected STA. For example, if the APs 102 and 103 function as Relay APs, AID=2 is assigned to the AP 102 and AID=3 is assigned to the AP 103. Note that a method of assigning an ID for identifying an AP and an assigning timing are not limited to them. For example, an AP ID for multi-AP may be assigned in addition to an AID. In this case, AP IDs assigned to the APs 102 and 103 are 1 and 2, respectively. If an AP ID is additionally assigned, the value of the AP ID falls within a range of 1 to 2007. For example, the Transmitter AP may create a dedicated frame for making a notification of the ID of each AP, and transmit the frame to the Relay AP.

Note that the Transmitter AP may perform formation of a group and ID assignment at different timings. An AP that perform formation of a group and ID assignment is not limited to the Transmitter AP, and may be the Relay AP (each of the APs 102 and 103) in FIG. 1. By performing formation of a group and ID assignment before data transmission, in this example, a time lag from when a trigger to cause the AP 101 as the Transmitter AP to transmit data to the STA 104 is provided until the data is actually transmitted is small.

Processing executed by the AP 102/AP 103 when receiving a Joint participation request from the AP 101 will now be described with reference to FIG. 5. FIG. 5 is a flowchart illustrating the processing executed by the AP 102/AP 103 when receiving a Joint participation request from the AP 101. The flowchart shown in FIG. 5 can be implemented when the control unit 202 of the AP 102/AP 103 executes a control program stored in the storage unit 201 to execute calculation and processing of information and control of each hardware component.

First, the communication control unit 301 of the AP 102/AP 103 receives, from the AP 101 as the Transmitter AP, a Joint participation request as a request for cooperation about multi-AP data transmission (Joint transmission) to the STA 104 (step S501, F401). The Joint participation request received at this time can include a participation policy indicating a condition for participation. The participation policy can include information such as the MAC address of the STA as a data transfer destination, a transmission policy for designating a coordinated transmission method, the total amount of data to be transferred, a data transfer timing, and a frequency band and sub-frequency used to transfer data. A frame analysis unit 304 of the AP 102/AP 103 confirms the participation policy (step S502). If, as a result of the confirmation, it is decided to participate in multi-AP data transmission, a communication control unit 301 of the AP 102/AP 103 returns, to the AP 101 as a Transmitter AP, a response in which Success is set in a Status Code (step S505, F402). This (step S505, F402) expresses to participate in Joint transmission. If it is impossible to participate in Joint transmission, the communication control unit 301 of the AP 102/AP 103 returns, to the AP 101, a response in which Failure is set in the Status Code, thereby expressing non-participation (step S504). If the AP 102/AP 103 sends a response indicating Success, it enters data transfer processing (step S506). The processing in step S506 will be described later with reference to FIGS. 6A and 6B.

Returning to FIG. 4, after confirming that data is transmitted to the STA 104 via the APs 102 and 103, the AP 101 transmits, to the APs 102 and 103, an indication (Sequence indication) indicating data to be transferred (F403). More specifically, the AP 101 instructs a sequence number assigned to a frame of a data unit to be transferred. Note that the data unit can be an MSDU (MAC Service Data Unit) or an A-MSDU (Aggregation-MSDU). The sequence number is a serial number assigned to each MSDU or A-MSDUs.

FIG. 7 shows an example of a frame used by the AP 101 to instruct the APs 102 and 103 of the sequence number at the time of data transmission. Fields/subfields shown in FIG. 7 comply with a format defined in the IEEE802.11ax standard. That is, the frame includes a Frame Control field 701, a Duration field 702, an A1 field 703, an HT Control field 705, a Frame Body field 706, and an FCS field 707.

The Frame Control field 701 includes a Type subfield 708 and a Subtype subfield 709 that are subfields for defining the type of the frame. If the values of the subfields are 0 and 13, respectively, this indicates that the frame is an Action Frame. If the frame is an Action Frame, the Frame Body field 706 includes a Category subfield 710 and an Action Details subfield 711. For example, if the value of the Category subfield 710 is 33, this indicates that the frame is an Action Frame (Multi-AP Action Frame) concerning multi-AP. Note that this may indicate an EHT Action Frame.

If the Category subfield 710 of the Action Frame indicates a Multi-AP Action Frame, the Action Details subfield 711 includes a Multi-AP Action subfield 712. If the value of the Multi-AP Action subfield 712 is 0, this indicates that the Multi-AP Action Frame is a Sequence Number Indication (that is, an indication of a sequence number). If the Action Frame is a Sequence Number Indication, a Starting Sequence Control subfield 713 and a Cascaded subfield 714 follow. The Starting Sequence Control subfield 713 indicates a sequence number to first be assigned when generating a frame by data units transferred by the Relay AP. The Starting Sequence Control subfield 713 includes a Fragment Number subfield 716 and a Starting Sequence Number subfield 717. The Fragment Number subfield 716 need not be included. A value of 0 is input. The Starting Sequence Number subfield 717 is assigned with a first sequence number to be assigned when generating a frame by the data units transferred by the Relay AP. For example, if the AP 102 wants to transmit, to the STA 104, the data units from a data unit of a sequence number of 30, the sequence number of 30 is assigned.

The Cascaded subfield 714 is used when the sequence number of the data unit to be transferred is dropped out. If the value of the Cascaded subfield 714 is 1, an Ending Sequence Control subfield 715, a Starting Sequence Control subfield 713, and a Cascaded subfield 714 further follow. The Ending Sequence Control subfield 715 includes a Fragment Number subfield 718 and an Ending Sequence Number subfield 719. The Fragment Number subfield 718 need not be included. The Ending Sequence Number subfield 719 stores a sequence number immediately before the dropped out sequence number among the sequence numbers assigned to the data units to be transferred. Note that a sequence number immediately after the dropped out sequence number may be stored. The sequence number to be assigned again is designated in the Starting Sequence Number subfield 717 of the Starting Sequence Control subfield 713 to be assigned next. That is, sequence numbers from the Ending Sequence Number subfield 719 included in the Ending Sequence Control subfield 715 to a Starting Sequence Number subfield 717 included in a Starting Sequence Control subfield 713-2 are dropped out. Note that if the value of the Cascaded subfield 714 is 0, no subfields follow. In this way, the AP 101 can designate a sequence number assigned to the frame when the AP 102/AP 103 transfers the data units. Note that the Cascaded subfield 714 need not be included. In this indication method, it is possible to designate, by a less information amount, the sequence number of the frame used to transfer the data to the Relay AP.

Note that the above-described method of designating the sequence number is merely an example, and another method may be used. The Cascaded subfield 714 may be included before the Starting Sequence Control subfield 713. In this case, the Cascaded subfield 714, the Starting Sequence Control subfield 713, and the Ending Sequence Control subfield 715 may form a set. Alternatively, a Size subfield indicating the number of sets of Starting Sequence Control subfields 713 and Ending Sequence Control subfields 715 may be prepared. This allows the side of analyzing the fields to first ascertain the size, and then ascertain the contents. A subfield indicating the type of the Sequence Number Indication may be included after the Multi-AP Action subfield 712. If the value of the subfield is 0, the above-described subfields 713 to 715 follow as a Normal Sequence Number Indication. If the value of the subfield is 1, it is possible to indicate sequence numbers corresponding to a plurality of TIDs as a Multi-TID Sequence Number Indication. To do this, Per-TID Info subfields are added in addition to the above-described subfields 713 to 715. By adding the value of the TID to each Per-TID Info subfield, a Starting Sequence Control subfield is designated for each TID. At this time, the Per-TID Info subfield and the Starting Sequence Control subfield form a set. To indicate the plurality of TIDs, Per-TID Info subfields and Starting Sequence Control subfields, the numbers of which are equal to the number of TIDs, follow the Starting Sequence Control subfield. Note that as a method of instructing a sequence number, a method of storing information in part of a BAR or part of a data frame instead of the dedicated frame may be used. For example, the first portion of the frame body of the data frame is used or a new Type is defined in the BA Type of the BAR, and then information of the subfields 712 to 719 shown in FIG. 7 or information similar to this information may be stored.

After designating the sequence number, the AP 101 stores, in the data frame, the data units to be transferred to the STA 104, and transmits the data frame to the AP 102/AP 103 (F404). Note that the order of F403 and F404 may be reversed. Whether a BA Request (BAR) or BA after transmission of the data frame is required is determined in accordance with the following three requirements. As the first requirement, it is determined whether an ADDBA procedure for deciding to use, in communication, a BA for collectively returning an Ack with respect to a plurality of frames has already been performed between the AP 101 and the AP 102/AP 103. If this procedure has not been performed, an Ack is returned for each frame. Even if this procedure has been performed, the same is applied to a case in which there is no TID of the target of the ADDBA procedure. As the second requirement, it is determined whether a Block Ack Policy designated by an ADDBA Request and ADDBA Response transmitted/received during the ADDBA procedure is an Immediate Block Ack. If the Block Ack Policy is not an Immediate Block Ack, an Ack is returned once in response to the BAR and then a BA is also returned. As the third requirement, it is determined whether the value of an Ack Policy assigned to a QoS Control field included in the data frame indicates an Implicit Block Ack. Note that the value indicates an Implicit Block Ack, it is possible to transmit a BA without any BAR. In this embodiment, a BAR is unnecessary in the procedure of the series of processes.

FIG. 8 shows an example of the data frame transmitted by the AP 101. The data frame (F408) transmitted by the AP 102/AP 103 also has the same structure. Fields/subfields shown in FIG. 8 comply with a format defined in the IEEE802.11ax standard. That is, the data frame includes a Frame Control field 801, a Duration field 802, an A1 field 803, an A2 field 804, an A3 field 805, a Sequence Control field 806, an A4 field 807, a QoS Control field 808, an HT Control field 809, a frame body field 810, and an FCS field 811 in this order. The Sequence Control field 806 is assigned with (includes) a sequence number assigned to a data unit (units) included in the data frame. The Sequence Control field 806 can include a Sequence Number subfield and a Fragment Number subfield. The frame body field 810 (payload portion) is assigned with (includes) the data units.

The QoS Control field 808 includes an Ack Policy subfield 812. Depending on the value of the Ack Policy subfield 812, a method of transmitting a BAR and BA is different. If the value of the Ack Policy subfield indicates an Implicit Block Ack (0), a BA is returned without any BAR. If the value of the Ack Policy subfield indicates No Ack (1) or No explicit Ack (2), neither an Ack nor a BA is returned. If the value of the Ack Policy subfield indicates a Block Ack (3), a BAR and a BA are used. In this embodiment, assume that the value of the Ack Policy subfield 812 indicates a Block Ack. That is, the value is 3.

Returning to FIG. 4, the AP 101 transmits a BAR for prompting the AP to return a BA in accordance with the condition at the time of transmitting the data frame (F405). In response to this, the AP 102/AP 103 returns a BA (F406). Note that transmission/reception of a BAR and a BA is performed in accordance with the above-described condition. The BAR and BA used here indicate the AP 101 can transmit data to the AP 102/AP 103. Note that as another example, in a procedure of an ADDBA Request and an ADDBA Response between the AP 101 and the AP 102/AP 103, the value of the Block Ack Policy may be set to 0 to indicate no Immediate Block Ack, and only an Ack may be returned in response to the BAR from the AP 101. In this case, each of the APs 102 and 103 may directly return, to the AP 101, a reception confirmation indicating that the data can be transmitted to the STA 104. Thus, the AP 101 can obtain, as a reception confirmation indicating that the data is transmitted to the AP 102/AP 103, only a result of data transmission to the STA 104. As a result, the AP 101 can confirm, with a smaller data amount, whether the data arrives at the final target destination.

After the completion of transmission of transferred data to the APs 102 and 103 as Relay APs, the AP 101 transmits, to the APs 102 and 103, a trigger frame to instruct a data transfer timing (F407). Note that the frame to instruct a data transfer timing in F407 need not be a trigger frame. The present invention is not limited to reception of a frame from the AP 101 and any behavior used as a trigger to transfer data is used. For example, reception of a trigger frame from the STA 104 may be used. In this method, the AP 102/AP 103 can transfer the data at a timing when the STA 104 can receive the data, thereby reducing data loss. Alternatively, a timing when the last four digits of a time described in a Timestamp generated by the beacon of the AP 101 are set to 0 may be used. In this method, the AP 101 can instruct a data transfer timing without additionally sending a trigger frame. The data transfer timing may be a timing when the STA 104 is connected. In this method, while the STA 104 moves across the radio reception regions of a plurality of APs, the AP 102/AP 103 can transmit the data at a timing when the STA 104 comes close to the AP. Therefore, for the user of the STA 104, it is possible to implement an operation of obtaining desired data more quickly. In the example shown in FIG. 4, upon receiving the trigger frame from the AP 101, the AP 102/AP 103 creates a frame from the data units and the sequence number received in advance from the AP 101, and transmits the data frame to the STA 104 (F408). If there is no trigger frame, the AP 102/AP 103 may transmit the data frame to the STA 104 at a timing when it can perform transmission.

As the data frame transmitted in F408, the above-described frame shown in FIG. 8 can be used. A description of the same parts as those described above will be omitted. The Sequence Control field 806 is assigned with a serial sequence number starting from the sequence number instructed in F403. More specifically, the sequence number is assigned to the Sequence Number subfield of the Sequence Control field 806. If the data is interrupted, the value of the Fragment Number subfield is also used. The frame body field 810 (payload portion) is assigned with (includes) at least some of the data units received from the AP 101.

The QoS Control field 808 includes an Ack Policy subfield, and can store a value for deciding whether an Ack from the STA is required. The meaning of each value is as described above and a description thereof will be omitted. In this embodiment, assume that the value is set to 3 (Block Ack).

In accordance with the condition at the time of transmitting the data frame, the AP 102/AP 103 transmits a BAR for prompting the STA to return a BA (F409). Upon receiving the BAR, the STA 104 returns a BA (F410). Note that another method of returning an ACK may be used. For example, the STA may return one Ack for one frame instead of the BA. The value of the Ack Policy subfield may be set to 0 indicating an Implicit Block Ack and only a BA may be returned without requiring a BAR. The STA 104 may return an Ack once in response to the BAR, and then transmit a BA. The BA returned at this time is returned in a bitmap format based on the sequence number assigned to the frame received from each AP.

FIG. 9 shows an example of the BA (BA frame) used in F410. Fields/subfields shown in FIG. 9 comply with a format defined in the IEEE802.11ax standard. That is, the BA frame includes a Frame Control field 901, a Duration field 902, an RA field 903, a TA field 904, a BA Control field 905, a BA Information field 906, and an FCS field 907 in this order. The BA Control field 905 includes a BA Ack Policy subfield 908 and a BA Type subfield 909. Table 1 exemplifies the correspondence between the value of the BA Type subfield 909 and the BA type.

| Subfield Value | BA Type |
|---|---|
| 0 | Reserved |
| 1 | Extended Compressed |
| 2 | Compressed |
| 3 | Multi-TID |
| 4 | Multi-AP |
| 5 | Reserved |

-continued

| Subfield Value | BA Type |
|---|---|
| 6 | GCR |
| 7-9 | Reserved |
| 10 | GLK-GCR |
| 11 | Multi-STA |
| 12-15 | Reserved |

In this embodiment, the BA type of the BA transmitted in F410 is a Compressed BA indicated by a value of 2. If the value of the BA Type is 2, the BA Information field 906 includes a Block Ack Starting Sequence Control subfield 910 and a Block Ack Bitmap subfield 911. The Block Ack Starting Sequence Control subfield 910 includes a Fragment Number subfield 913 and a Starting Sequence Number subfield 914.

The Fragment Number subfield 913 (a fragment number represented by Bits 0, 1, 2, and 3) stores a value for deciding the length of the Block Ack Bitmap subfield 911. More specifically, if the values of Bits 1 and 2 are 0, the length of the Block Ack Bitmap subfield 911 is 8. If the values of Bits 1 and 2 are 2, the length of the Block Ack Bitmap subfield 911 is 32. If Bit 0 is 0, the fragment number is not indicated by the Block Ack Bitmap subfield 911. If Bit 0 is 1, each of the four values of the fragment number is represented by the bits of the Block Ack Bitmap subfield 911. Details thereof will be described later. The Starting Sequence Number subfield 914 indicates a sequence number from which the Block Ack Bitmap subfield 911 to be described later starts. If, for example, the sequence numbers in the received data frame are 3, 4, and 5, the value is set to 3. The Block Ack Bitmap subfield 911 indicates the relative ordinal number of the received frame from the sequence number instructed by the Starting Sequence Number subfield 914. For example, if the value of the Starting Sequence Number subfield 914 is 3, the sequence numbers of the received data units are 3, 4, and 5, and Bit 0 of the Fragment Number subfield 913 is 0, the first, second, and third bits are 1. The fragment number is a value assigned when the frame is divided. If the value of Bit 0 of the Fragment Number subfield 913 is 1, this value is also reflected on the Block Ack Bitmap subfield 911.

A specific bit of a specific Block Ack Bitmap subfield 911 which is set to 1 is considered in accordance with the following formula.

$$n=4\times(SN-SSN)+FN$$

where n represents the ordinal number of a bitmap, SN represents the sequence number, SSN represents the value of the Starting Sequence Number subfield 914, and FN represents the value of the fragment number. Note that the case in which the BA type is 2 is exemplified here, and another value may be set. Even if another value is set, a BA is communicated in a format complying with the IEEE802.11ax standard. By receiving the above-described BA, the AP 102/AP 103 can know a data unit corresponding to a specific sequence number, which can be received by the STA 104.

Note that the STA 104 basically returns a BA based on the sequence number corresponding to the AP that has transmitted the data but may additionally give information. For example, consider a case in which the STA 104 receives data units of sequence numbers of 3, 4, and 5 from the AP 102, and receives data units of sequence numbers of 6, 7, and 8 from the AP 103. In this case, to indicate to the AP 102 that the data units of the sequence numbers of 3, 4, and 5 can be received, the STA 104 returns a BA in which the value of the Starting Sequence Number subfield 914 is set to 3 and the first, second, and third bits of the Block Ack Bitmap subfield 911 are set to 1. In addition to this, to indicate that the data units of the sequence numbers of 6, 7, and 8 can be received, the STA 104 may return a BA in which the fourth, fifth, and sixth bits of the Block Ack Bitmap subfield 911 are set to 1. With processing to be described later, the AP 102 transfers this information (information indicating the data units that can be received) to the AP 101. Thus, even if, for example, a communication failure occurs between the APs 101 and 103 and the AP 101 cannot obtain BA information of the STA 104 to be received from the AP 103, the AP 101 can know the reception status of the STA 104 via the AP 102.

The STA 104 may return a BA only to the AP 102. In this case, since the STA 104 can transmit a BA to the APs 102 and 103 by only one transmission operation although a BA should originally be transmitted twice to the APs 102 and 103, the STA 104 can suppress the power consumption. In addition, the STA 104 is prevented from using many bands. Furthermore, since only bands used by the AP 102 and the STA 104 are used for the procedure of the BA, bands used by the AP 103 and the STA 104 are available. The AP 101 can prepare and transmit next transmission data using the bands via the AP 103, thereby implementing high throughput and a low delay of the data transmitted from the AP 101 to the STA 104.

After confirming, by the sequence numbers included in the above-described BA, data units which have correctly arrived at the STA 104, the AP 102/AP 103 generates a BA including information (the sequence numbers for which reception has been confirmed) of the BA, and transmits the generated BA to the AP 101 (F411). That is, the AP 102/AP 103 transfers information of the BA received in F410 to the AP 101. The BA frame transmitted at this time is as exemplified in FIG. 9. A detailed description of the parts described above will be omitted. The BA transmitted in F411 indicates a Multi-AP BA by setting the value of the BA Type subfield 909 to 4 (see Table 1). If the BA Type subfield 909 indicates a Multi-AP BA, the BA Information field 906 has the same field format as that for the Compressed BA. Note that this field 906 may be, for example, the same field as that for an Extended Compressed BA or a field format may be newly defined for this field 906. For example, this field format may be similar to that of the Action Details subfield 711 shown in FIG. 7.

In this embodiment, each value of the BA Information field 906 in the BA transmitted in F411 is obtained by copying the BA Information field 906 received in F410. If, based on the information of the BA received from the AP 102/AP 103, there is data to be retransmitted or there is data to be additionally transmitted, the AP 101 further transmits a data frame (F412). At this time, the AP 101 may change, in accordance with the status of the BA, a method and a data amount to be transmitted, with respect to the data frame to be transmitted. For example, assume that the AP 101 knows that the STA 104 can receive all the data transmitted via the AP 102 and some of the data transmitted via the AP 103 do not arrive at the STA 104. In this case, the data to be retransmitted or the data to be additionally transmitted can mainly be transmitted via the AP 102. This can dynamically change the optimum route and transmission method for data transmission to the STA 104.

In the above description, the AP 102/AP 103 receives the BA from the STA 104, and then immediately transfers information of the BA to the AP 101. However, another method may be used. For example, if the AP 102/AP 103 detects the sequence number of a data unit which has not been received by the STA 104 (that is, the AP 102/AP 103 detects that there is data to be retransmitted), the AP 102/AP 103 may repeatedly retransmit a data frame including the data unit corresponding to the detected sequence number. The maximum number of times of retransmission (the maximum value of the number of times of repetitive transmission) may be defined in advance. The retransmitted data frame may include all the data units to be transferred or include some data units including a data unit (units) corresponding to the sequence number for which reception has not been confirmed by the STA 104. The AP 102/AP 103 may collectively transmit the information of the BAs to the AP 101 in F411 after repetitive retransmission. In this case, the value of the Starting Sequence Number subfield 914 of the BA returned by the STA 104 may change depending on the retransmitted data unit. For example, if the AP 102/AP 103 transmits the data units of the sequence numbers of 3, 4, and 5, and reception can be confirmed for the data units of the sequence numbers of 3 and 4, the data unit of the sequence number of 5 is retransmitted. The value stored in the Starting Sequence Number subfield 914 of the BA obtained after the operation is 5. Thus, contents expressed by the Block Ack Bitmap subfield 911 are different from those in the first transmission operation. Therefore, it is impossible to transfer the frame to the AP 101 by copying the BA Information field 906 transmitted by the STA 104. In the above-described case, if the AP 102/AP 103 can confirm reception of the data unit of the sequence number of 5 in the second transmission operation, a BA in which the value of the Starting Sequence Number subfield 914 is set to 3 and the first, second, and third bits of the Block Ack Bitmap subfield 911 are set to 1 is transmitted in F411.

Therefore, if data transmission can immediately be corrected by retransmission, it is possible to retransmit the data with less delay. On the other hand, it takes more time for the AP 101 to know the data transmitted to the STA 104 have arrived at the STA 104, and thus it may take long time if the route is changed. In consideration of this, for example, the AP 102/AP 103 may transfer information of a BA to the AP 101 immediately after receiving the BA from the STA 104 while performing a retransmission operation, and may transmit a BA to the AP 101 if data reception is additionally confirmed. Note that additional data reception confirmation can be performed only by the method according to the first embodiment, and is difficult to implement by a method according to the second embodiment to be described later.

The AP 102/AP 103 may transmit, to the AP 101, as a BA, pieces of information (sequence numbers for which reception has been confirmed) of a plurality of Acks transmitted from the STA 104 with respect to the respective data units. By collectively transmitting, to the AP 101, as a BA, the pieces of information of the plurality of Acks arriving from the STA 104, the bands are saved. Conversely, the AP 102/AP 103 may transmit, to the AP 101, as an Ack, each of the pieces of information of the BAs received from the STA 104. Similarly, the AP 102/AP 103 may transmit, to the AP 101, a BA obtained by combining BAs for respective TIDs in a Multi-TID format. In this case, as described above, by collectively transmitting a BA, the bands are saved. Conversely, the AP 102/AP 103 may divide, for each TID, the BA in the Multi-TID BA format received from the STA 104, and transmit the divided BAs to the AP 101. By designating the format, it is possible to transfer a reception confirmation from the STA 104 to the AP 101 without increasing the number of BA Types. By avoiding complexity of the standard, it is possible to decrease a calculation amount necessary to process the format of the standard.

Processes in F403 to F411 of FIG. 4 by the AP 102/AP 103, which correspond to the processing in step S506 of FIG. 5, will be described next with reference to FIGS. 6A and 6B. FIGS. 6A and 6B are flowcharts illustrating processing when the APs 102 and 103 transmit data to the STA 104 according to this embodiment. The flowcharts shown in FIGS. 6A and 6B can be implemented when the control unit 202 of the AP 102/AP 103 executes a control program stored in the storage unit 201 to execute calculation and processing of information and control of each hardware component.

The AP 102 will be exemplified below but the same processing is applicable to the AP 103. This processing starts when the communication control unit 301 of the AP 102 receives, from the AP 101 as a Transmitter AP, data to be transferred to the STA 104. This processing may start when the communication control unit 301 of the AP 102 receives, from the AP 101, a sequence indication frame exemplified in FIG. 7.

Before receiving, as a data frame, data to be transferred to the STA 104, the communication control unit 301 of the AP 102 confirms whether a sequence indication frame (F403) has already been received (step S601). If no sequence indication frame has been received (NO in step S601), the AP 102 is instructed to execute normal data transfer processing instead of Multi-AP data transfer processing. In this case, the process advances to step S602 and subsequent steps, and the communication control unit 301 of the AP 102 receives, as a data frame, data to be transferred to the STA 104 (step S602). Next, the communication control unit 301 of the AP 102 receives a BAR (step S604), and returns a BA (step S605). Note that the processes (reception and transmission of the BAR and BA) in steps S604 and S605 need not be performed in accordance with the value of the Ack Policy subfield included in the data frame received in step S602 and the like. The communication control unit 301 of the AP 102 can receive, via wired or wireless communication, the data to be transferred.

After steps S602 to S605, the frame generation unit 302 of the AP 102 generates a data frame including the received data, and the communication control unit 301 starts to transfer the data frame to the STA 104 (step S606). The Ack control unit 303 confirms the Ack Policy subfield of the data frame, and determines whether an Ack response policy is ON or not (whether an Ack for the transferred data is required or not). If the Ack response policy is not ON, that is, an ACK is not required (NO in step S607), the AP 102 ends the processing after transferring the data. If the Ack response policy is ON, that is, an Ack is required (YES in step S607), the communication control unit 301 of the AP 102 transmits a BAR after transmitting all the data or some data (step S608). Transmission of a BAR in step S608 need not be performed.

If the communication control unit 301 of the AP 102 receives a BA from the STA 104 (step S609), the frame analysis unit 304 analyzes the bitmap of the BA and confirms reception of the data (step S610). More specifically, the frame analysis unit 304 of the AP 102 analyzes contents of the Block Ack Bitmap subfield 911 of the BA Information field 906 of the BA (FIG. 9), and confirms whether an Ack for transmission of all the data units is received. If, as a result of the confirmation, reception of all the data units can be confirmed (YES in step S611), the AP 102 ends the processing. If there is a data unit for which reception cannot be confirmed (NO in step S611), the frame generation unit 302 of the AP 102 sets the retransmission data (the data unit for which reception cannot be confirmed) in the data frame (step S612). If data transmission is additionally performed, the frame generation unit 302 sets next transmission data (additional data) in the data frame. Then, the communication control unit 301 of the AP 102 transmits the data frame (step S606).

In step S601, the communication control unit 301 of the AP 102 has already received the sequence indication frame (F403) before receiving, as a data frame, the data to be transferred to the STA 104 (YES in step S601, F405), the process advances to step S603. Note that the case in which the sequence indication frame (F403) has been received includes a case in which the sequence indication frame is received after receiving the data to be transferred and a case in which the sequence indication frame is received while receiving the data to be transferred. The communication control unit 301 of the AP 102 receives, as a data frame, the data to be transferred (step S603, F404). The data frame can include data units. Subsequently, the frame analysis unit 304 of the AP 102 confirms whether the received data are to be transferred (transmitted) by Multi-AP communication (step S613).

Examples of this confirmation method are as follows. As in the example shown in FIG. 4, after the communication control unit 301 of the AP 102 receives a Joint participation request from the AP 101 and assert to participate in Joint transmission, it may be determined that all the data (data units) received from the AP 101 are transferred by Multi-AP communication. In this case, it is possible to suppress an information amount transmitted/received after the Joint procedure. Alternatively, if the AP 101 transmits a data frame as the data to be transferred, a bit indicating transfer by Multi-AP communication may be prepared in 1 bit of the HT Control field. This allows the AP 102 that has received the data frame to determine transfer by Multi-AP communication with respect to the data frame in which the bit is set. In this method, the AP 101 can dynamically change whether transfer is performed by Multi-AP communication, and can perform processing in accordance with the status. Alternatively, the AP 101 may set a field indicating a period in the Joint participation request frame, and the AP 102 may determine that all data frames received from the AP 101 during the indicated period are transferred by Multi-AP communication. In this method, the AP 101 can designate a period during which transfer is performed by Multi-AP communication, and thus need not perform a procedure of deleting Joint transmission after transfer by Multi-AP communication becomes unnecessary. Alternatively, the AP 101 may set the MAC Address of the destination STA (the MAC address of the STA 104 in this embodiment) in the Joint participation frame. Thus, if the AP 102 receives, from the AP 101, data to be transferred to the destination STA, it can determine that all the data are transferred by Multi-AP communication. If the received data (data frame) are data to be transferred by Multi-AP communication (YES in step S613), the process advances to step S614; otherwise (NO in step S613), the process advances to one of steps S604 to S606.

After it is confirmed that the data to be transferred are data to be transferred by Multi-AP communication, the Ack control unit 303 confirms the Ack Policy subfield of the data frame, and determines whether the Ack response policy is ON (step S614). That is, the Ack control unit 303 determines whether an Ack for the transferred data is required. Note that the determination processing can be processing of determining whether it is necessary to transfer an Ack from the STA 104 to the Transmitter AP. Examples of the method of determining whether the Ack response policy is ON are as follows. If the Ack Policy subfield of the data frame received from the AP 101 is confirmed to indicate No Ack, the Ack control unit 303 of the AP 102 may determine that the Ack response policy is not ON (an Ack from the STA 104 is not required). Alternatively, a field indicating an Ack Policy from the STA 104 may be prepared in the Joint participation request frame received in advance from the AP 101, and the Ack control unit 303 of the AP 102 may perform determination in accordance with the value of the field. If the Ack response policy is not ON, that is, it is unnecessary to transfer an Ack to the AP 101 (NO in step S614), the process advances to one of steps S604 to S606.

If the Ack response policy is ON, that is, it is determined that an Ack is required (YES in step S614), the communication control unit 301 of the AP 102 receives a BAR (step S615, F405) and returns a BA (step S616, F406) to confirm with the AP 101 that the data for transfer has been received. Note that these processes (one of them) need not be performed.

The communication control unit 301 of the AP 102 receives, from the AP 101, a trigger frame indicating a data transfer timing when it is ready to transfer the data (step S617, F407). Note that as described above, a trigger frame need not be received, and a data transfer timing may be decided by a method other than the trigger frame. In response to the reception of the trigger frame, the frame generation unit 302 of the AP 102 generates a data frame by assigning, to a predetermined field, the sequence number (FIG. 9) designated by the received sequence indication frame (step S601, F403), and assigning, to a payload portion, a data unit corresponding to the sequence number. The data unit corresponding to the sequence number can be at least some of the data units included in the received data frame. Subsequently, the communication control unit 301 of the AP 102 transmits the data frame (step S618, F408). To request the STA 104 to confirm the reception of the data frame, the communication control unit 301 of the AP 102 transmits a BAR (step S619, F409). Note that a BAR need not be transmitted.

Subsequently, the communication control unit 301 of the AP 102 receives a BAR or a BA with request to the data frame (step S620, F410), and the frame analysis unit 304 analyzes the bitmap of the BA to confirm the reception of the data (step S621). More specifically, the frame analysis unit 304 of the AP 102 analyzes contents of the Block Ack Bitmap subfield 911 of the BA Information field 906 of the BA (FIG. 9), and confirms whether an Ack for transmission of all the data units is received.

If, as a result of the confirmation, the reception of all the data units can be confirmed (YES in step S622), the frame generation unit 302 of the AP 102 generates a frame for a transmission completion notification, and the communication control unit 301 transmits the frame to the AP 101 (Transmitter AP) (step S623). At this time, the frame used (generated) for the transmission completion notification is as follows. For example, as shown in FIG. 4, the AP 102 can generate a BA by copying the BA Information field 906 included in the BA received from the STA 104, and transmit the BA to the AP 101 (F411). In this method, a less calculation amount is required by the AP 102 to recreate a frame. In addition, the processing in step S621 of analyzing the Block Ack Bitmap subfield 911 included in the BA Information field 906 need not be performed in the AP 102. As another method, a frame for a transmission completion notification is defined and the AP 102 transmits this frame. In this method, since it is only necessary to know transmission completion, a data capacity transmitted by the AP 102 is small.

On the other hand, if there is a data unit for which reception cannot be confirmed (a sequence number for which reception cannot be confirmed is detected) (NO in step S622), the process advances to step S624. In step S624, the frame generation unit 302 of the AP 102 generates a frame including a bitmap indicating the sequence number of the data unit which has not been received, and the communication control unit 301 transmits the frame to the AP 101. This notifies the AP 101 of a data unit that cannot be received by the STA 104 (a data unit that cannot be transmitted to the STA 104). For example, as shown in FIG. 4, the AP 102 can generate a BA by copying the BA Information field 906 included in the BA received from the STA 104, and transmit the generated BA to the AP 101 (F411). Alternatively, the AP 102 may transmit a frame representing the received sequence numbers by serial sequence numbers with a dropped out sequence number portion in the format in the Action Details subfield 711 of FIG. 7.

As described above, the AP 101 can transmit the data to the STA 104 via the AP 102/AP 103, and know data units which have arrived at the STA 104. As a result, the AP 101 can dynamically confirm the connection state between the AP 102/AP 103 and the STA 104, and route data transmission in accordance with the status. Furthermore, since the AP 101 can change data retransmission in accordance with the status, it can accurately transfer the data to the STA 104.

Note that as compared with the second embodiment to be described later, less processes need to be performed by the STA 104. More specifically, the STA 104 that receives the data may not know the order of the data at the time of receiving the data from the plurality of APs. If the sequence numbers assigned to the data units are consistent, the STA 104 need only sort the received data based on the sequence numbers, and can thus sort the data relatively easily. When the STA 104 transmits a BA to the AP 102/AP 103, the sequence numbers assigned to the data units received from the plurality of APs are consistent, and thus information concerning the data units received from the AP 103 is readily stored in, for example, the BA to be sent to the AP 102. To implement this, the AP 101 as the transmission source of the data unit (units) need to manage the order and sequence numbers of the data transmitted to the STA 104. Furthermore, the AP 101 needs to instruct a sequence number to be assigned to a frame when transferring the data to the AP 102/AP 103. Therefore, in this embodiment, processing of instructing a sequence number is required, as in F403 of FIG. 4.

Second Embodiment

In this embodiment, an AP 101 functions as a Transmitter AP. Each of APs 102 and 103 functions as a Relay AP, and communicates with an STA 104 by an instruction from the AP 101. This embodiment will describe a case in which the AP 101 transmits data to the STA 104 via the AP 102/AP 103. Note that unlike the first embodiment, the AP 101 transmits no indication of a sequence number to be assigned to a frame at the time of transferring the data. In the description of this embodiment, a description of the same parts as those in the first embodiment will be omitted.

FIG. 10 is a sequence chart showing the procedure of the overall data transmission/reception processing when the AP 101 transmits data to the STA 104 via the APs 102 and 103 according to this embodiment. The overall procedure is the same as in the first embodiment and a description thereof will be omitted. Note that as a different point from the first embodiment, the AP 101 does not transmit a sequence number indication frame (Sequence Indication) to the AP 102/AP 103 in F403. In this embodiment, sequence numbers assigned to data units to be transmitted by the APs 102 and 103 in F408 are values (numbers) originally defined by the AP 102/AP 103.

Processes in F403 to F411 of FIG. 10 by the AP 102/AP 103 will be described with reference to FIGS. 11A and 11B. FIGS. 11A and 11B are flowcharts illustrating processing when the APs 102 and 103 transmit data to the STA 104 according to this embodiment. The flowcharts shown in FIGS. 11A and 11B can be implemented when a control unit 202 of the AP 102/AP 103 executes a control program stored in a storage unit 201 to execute calculation and processing of information and control of each hardware component.

The AP 102 will be exemplified below but the same processing is applicable to the AP 103. This processing starts when a communication control unit 301 of the AP 102 receives, from the AP 101 as a Transmitter AP, data to be transferred to the STA 104.

First, the communication control unit 301 of the AP 102 receives, from the AP 101, as a data frame, data to be transferred to the STA 104 (step S603). The data frame can include data units. Subsequently, a frame analysis unit 304 of the AP 102 confirms whether the received data are to be transferred by Multi-AP communication (step S613). The confirmation method is the same as in the first embodiment and a description thereof will be omitted. Next, an Ack control unit 303 of the AP 102 confirms whether the data to be transmitted to the STA 104 requires an Ack (step S614). The confirmation method is the same as in the first embodiment and a description thereof will be omitted. If transfer is not performed by Multi-AP communication (NO in step S613) or it is determined that an Ack is not required (NO in step S614), the process advances to one of steps S604 to S606. Processes in steps S604 to S606 and subsequent steps are the same as in the first embodiment and a description thereof will be omitted.

If it is determined that the data to be transferred to the STA 104 require an Ack and are data to be transmitted by Multi-AP communication (YES in step S613 and YES in step S614), the process advances to step S1115. Next, the frame analysis unit 304 of the AP 102 acquires the sequence numbers assigned to the data units and stored in the received in the data frame, and records (saves) them in the storage unit 201 (step S1115). The recorded values (sequence numbers) are used in processing to be described later. After that, upon receiving a BAR (step S1116), the communication control unit 301 of the AP 102 transmits a BA in response to the BAR (step S1117). Note that neither the BAR nor the BA needs to be transmitted/received.

The communication control unit 301 of the AP 102 receives, from the AP 101, a trigger frame indicating a data transfer timing when it is ready to transfer the data (step S1118, F407). Note that a trigger frame need not be received, and a data transfer timing may be decided by a method other than the trigger frame. Details have been described in the first embodiment and a description thereof will be omitted. In response to the reception of the trigger frame, a frame generation unit 302 of the AP 102 generates a data frame by assigning the sequence number to a predetermined field (FIG. 9), and assigning, to a payload portion, a data unit corresponding to the sequence number. The data unit corresponding to the sequence number can be at least some of the data units included in the received data frame. In this embodiment, the sequence number is a number generated and assigned by a number management unit 305. The communication control unit 301 of the AP 102 transmits the data frame (step S1119, F408).

The number management unit 305 of the AP 102 generates information (correspondence) for associating the sequence number assigned to the data unit transmitted in step S1119 with the sequence number assigned to the data unit when the data unit is received, and saves (manages) the information in the storage unit 201 (step S1120). Consider, for example, a case in which the sequence numbers assigned to the data units when received in step S603 are 3, 4, and 5, and the sequence numbers assigned to the data units transmitted in step S1119 are 9, 10, and 11. At this time, the number management unit 305 saves sets of 3-9, 4-10, and 5-11 in the storage unit 201. Alternatively, the number management unit 305 may save only the set of 3-9, and the remaining units may be assumed to have serial numbers from 3 and 9. In this way, the number management unit 305 stores the information of the correspondence between the sequence numbers in the storage unit 201 to associate, for each transferred data unit, the sequence numbers with each other at the time of receiving and transmitting the data unit.

Upon completion of data transmission to the STA 104, the communication control unit 301 of the AP 102 transmits a BAR (step S1121, F409), and receives a BA from the STA 104 in response to the BAR (step S1122, F410). At this time, the BAR need not be transmitted. A BA may be in another format. For example, an Ack may be returned for each data unit. Upon receiving the BA, the frame analysis unit 304 of the AP 102 analyzes the bitmap of the BA to confirm reception of the data (step S1123). More specifically, the frame generation unit 302 of the AP 102 analyzes contents of a Block Ack Bitmap subfield 911 assigned to a BA Information field 906 of the BA (FIG. 9), and confirms whether an Ack is received with respect to transmission of all the data units.

If, as a result of the confirmation, reception of all the data units can be confirmed (YES in step S1124), the frame generation unit 302 of the AP 102 generates a frame for a transmission completion notification, and the communication control unit 301 transmits the frame to the AP 101 (Transmitter AP) (step S1125). As the transmission completion notification transmitted at this time, a dedicated frame may be created, or a frame may be transmitted in the format of the BA shown in FIG. 9. If the transmission completion notification is transmitted in the format of the BA shown in FIG. 9, the value of a Starting Sequence Number subfield 914 included in a Block Ack Starting Sequence Control subfield 910 and, in some cases, the value of the Block Ack Bitmap subfield 911 can be different from the values of the same subfields in the BA received from the STA 104. That is, the sequence number indicated by the BA received from the STA 104 can be different from the sequence number indicated by the BA transmitted to the AP 101. Therefore, based on the correspondence generated in step S1120, the frame generation unit 302 converts the sequence number indicated by the received BA into the sequence number to be indicated by the BA transmitted to the AP 101.

More specifically, based on the correspondence generated in step S1120, the frame generation unit 302 converts the value of the Starting Sequence Number subfield in the BA received from the STA 104 into a value when the AP 102 receives the data from the AP 101. Note that if a value different from the converted value is set as the value of the Starting Sequence Number subfield, the value of the Block Ack Bitmap subfield 911 is changed. The relative distance of the sequence number used when the AP 102 receives the data is calculated from the value to be designated as the Starting Sequence Number subfield, and is reflected on a bit corresponding to the ordinal number of the calculation result.

The sequence number conversion processing in step S1125 is also applied to a case in which there is a data unit for which reception cannot be confirmed (a case in which a sequence number for which reception cannot be confirmed is detected) (NO in step S1124) (step S1126). Then, the frame generation unit 302 of the AP 102 generates a frame including a bitmap indicating the sequence number of the data unit which has not been received, and the communication control unit 301 transmits the frame to the AP 101 (step S1127). Note that in this embodiment as well, the AP 102/AP 103 may retransmit a data unit for which a reception confirmation has not been received (a data unit which has not arrived at the STA 104) a plurality of times, and then transmit the result to the AP 101. Details of the method are the same as in the first embodiment and a description thereof will be omitted. Alternatively, the received sequence numbers can be represented by serial sequence numbers with a dropped out sequence number portion in the format in an Action Details subfield 711 of FIG. 7.

As described above, the AP 101 can confirm the data which has arrived at the STA 104 without instructing sequence numbers when transferring the data to the AP 102/AP 103. Thus, the AP 101 can dynamically switch the AP that instructs data transfer. As compared with the first embodiment, it is unnecessary to transmit a frame to instruct a sequence number when transferring data. Therefore, it is possible to suppress the time during which the bands are used when instructing data transfer.

Third Embodiment

In this embodiment, an AP 101 functions as a Receiver AP. An STA 104 functions as a Transmitter STA. Each of APs 102 and 103 functions as a Relay AP, and communicates with the STA 104 by an instruction from the AP 101. This embodiment will describe a case in which the STA 104 transmits data to the AP 101 via the AP 102/AP 103. In the description of this embodiment, a description of the same parts as those in the first embodiment will be omitted.

FIG. 12 is a sequence chart showing the procedure of the overall data transmission/reception processing when the STA 104 transmits data to the AP 101 via the APs 102 and 103 according to this embodiment. Transmission and reception of a Joint participation request frame (F401 and F402) are the same as in the first embodiment and a description thereof will be omitted.

Upon completion of a Joint procedure, the STA 104 designates, to the AP 102/AP 103, a sequence number when receiving data (F1203). This allows the AP 101 to sort the data correctly when integrating the data frames from the AP 102/AP 103. Subsequently, the STA 104 transmits a data frame to the AP 102/AP 103 (F1204). Upon completion of the transmission of the data frame, the STA 104 transmits a BAR (F1205). In response to the reception of the BAR, the AP 102/AP 103 returns a BA (F1206). Note that neither the BAR nor the BA needs to be transmitted/received. As another example, in the procedure of an ADDBA Request and ADDBA Response, a Block Ack Policy may be set to 0 to indicate no Immediate Block Ack. In this case, in response to the BAR, the AP 102/AP 103 may return an Ack that does not designate a sequence number. In this case, the AP 102/AP 103 transmits a BA after confirming reception by the AP 101. The remaining Ack response operations are the same as in the first embodiment and a description thereof will be omitted.

After completion of the data reception from the STA 104, the AP 102/AP 103 transmits the data as a data frame (F1207). Note that while receiving the data from the STA 104, the AP 102/AP 103 may transfer the data to the AP 101 (F1207). Upon completion of the data transfer, the AP 102/AP 103 transmits a BAR (F1208). The BAR need not be transmitted. In response to the BAR, the AP 101 transmits a BA to the AP 102/AP 103 (F1209). The AP 102/AP 103 transmits, to the STA 104, information of the BA in the format of a BA (F1210). In accordance with the received information of the BA, the STA 104 transmits retransmission data to the AP 102/AP 103, as necessary (F1211).

Processes in F1203 to F1211 of FIG. 12 by the AP 102/AP 103 will be described with reference to FIGS. 13A and 13B. FIGS. 13A and 13B are flowcharts illustrating processing when the APs 102 and 103 transmit data to the AP 101 according to this embodiment. The flowcharts shown in FIGS. 13A and 13B can be implemented when a control unit 202 of the AP 102/AP 103 executes a control program stored in a storage unit 201 to execute calculation and processing of information and control of each hardware component. The AP 102 will be exemplified below but the same processing is applicable to the AP 103.

Similar to the first embodiment, a communication control unit 301 of the AP 102 confirms whether a frame for designating a sequence number has been received (step S1301). After that, the communication control unit 301 of the AP 102 receives, from the Transmitter STA (STA 104), a data frame as data to be transferred to the Receiver AP (AP 101) (step S1302 or S1303). Processing if the frame for designating a sequence number has not been received (NO in step S1301), if the received data frame is not a frame received by Multi-AP communication (NO in step S1313), or if an Ack need not be returned (NO in step S614) is similar to that described in the first embodiment and a description thereof will be omitted. Processes in steps S615 to S622 are the same as those described in the first embodiment and a description thereof will be omitted.

If a frame analysis unit 304 of the AP 102 can confirm reception of all data units (YES in step S622), the communication control unit 301 transmits a transmission completion notification to the STA 104 (step S1323). The transmission format at this time may be the format of a BA or a dedicated frame may be prepared. Details are the same as in the first embodiment and a description thereof will be omitted. If there is a data unit for which reception cannot be confirmed (NO in step S622), the communication control unit 301 of the AP 102 can generate a BA by copying a BA Information field 906 included in a BA received from the AP 101, and transmit the generated BA to the STA 104. Alternatively, the AP 102 may transmit a frame representing the received sequence numbers by serial sequence numbers with a dropped out sequence number portion in the format in an Action Details subfield 711 of FIG. 7.

As described above, even in data reception, a data transmitter can be notified of a data reception confirmation. Note that the second embodiment may be applied to this embodiment. In this case, in FIGS. 10, 11A, and 11B, as the two communication apparatuses that communicate with each other, the Transmitter AP is changed to a Transmitter STA and the Receiver STA is changed to a Receiver AP. The contents of the processing remain the same. For example, the Transmitter STA designates no sequence number, and the AP 102/AP 103 generates and uses a sequence number. A BA transmitted to the Transmitter STA can include a sequence number converted by the AP 102/AP 103 in accordance with the correspondence between the sequence numbers.

Other Embodiments

As other embodiments, the present invention is also applicable to data transmission/reception among one AP and three STAs. In this case, the STAs perform a procedure of a Joint participation frame and a participation completion frame. If the AP transmits data to the STA, each of the remaining two STAs may play a role as a Relay STA. In this case, the Relay STA transfers the data and a BA. The processing by the Relay STA is the same as the operation of the Relay AP proposed in the present invention. This can be applied when the equipment of each STA is not so rich. By combining non-rich communication apparatuses, a high-throughput and low-delay wireless communication environment can be implemented. If conditions are satisfied, the present invention may be applied to a case in which three APs and three STAs perform data communication in cooperation with each other. Two of the three APs operate as Relay APs and the remaining one AP operates as a Transmitter AP or a Receiver AP. Two of the three STAs operate as Relay STAs and the remaining one STA operates as a Transmitter STA or a Receiver STA. Processes by the Relay AP and the Relay STA are as described in each of the embodiments. In this case, the equipment of both the AP and the STA is not rich but this form can be used to implement high throughput and a low delay or to suppress interference occurring in communication. By performing wired communication between the APs and between the STAs and performing wireless communication between the AP and the STA, the distance between each AP and each STA can be increased, thereby implementing high throughput and a low delay while suppressing radio interference.

According to the present invention, in multi-AP communication, a data transmission source can acquire a data reception confirmation in a data transmission destination.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus complying with an IEEE802.11 series standard, comprising:

at least one memory that stores a set of instructions; and at least one processor that executes the instructions, the instructions, when executed, causing the communication apparatus to perform operations including:

receiving, from a first other communication apparatus, data units and an indication of a sequence number assigned to at least one data unit of the data units;

transmitting, to a second other communication apparatus, a data frame including the sequence number and the at least one data unit;

receiving, from the second other communication apparatus, a first reception confirmation with respect to the transmitted data frame; and transmitting, to the first other communication apparatus, information of the sequence number of the data unit received by the second other communication apparatus, which is included in the first reception confirmation, wherein every time the first reception confirmation is received, the communication apparatus transmits, to the first other communication apparatus, the information of the sequence number included in the first reception confirmation, and wherein the communication apparatus transmits, to the first other communication apparatus, a second reception confirmation including the information of the sequence number of the data unit received by the second other communication apparatus and including information indicating that the second reception confirmation is a reception confirmation for multi-access point coordination.

2. The communication apparatus according to claim 1, wherein the operations further comprise detecting, based on the received first reception confirmation, a sequence number of a data unit that has not been received by the second other communication apparatus, wherein the communication apparatus transmits, to the second other communication apparatus, the data frame including the detected sequence number and the data unit corresponding to the detected sequence number.

3. The communication apparatus according to claim 2, wherein in a case where the sequence number is detected, the communication apparatus repeatedly transmits, to the second other communication apparatus, a data frame including the data unit corresponding to the detected sequence number, and the communication apparatus collectively transmits, to the first other communication apparatus, information of the sequence numbers included in the repeatedly-received first reception confirmations.

4. The communication apparatus according to claim 3, wherein a maximum value of a repetition count is defined in advance.

5. The communication apparatus according to claim 1, wherein the first reception confirmation is a Block Ack.

6. The communication apparatus according to claim 1, wherein the data unit is a MAC Service Data Unit (MSDU) or an Aggregation-MSDU (A-MSDU), and the sequence number is a serial number assigned to each MSDU or each A-MSDU.

7. The communication apparatus according to claim 1, wherein the first other communication apparatus is an access point and the second other communication apparatus is a terminal apparatus.

8. The communication apparatus according to claim 1, wherein the first other communication apparatus is a terminal apparatus and the second other communication apparatus is an access point.

9. A non-transitory computer-readable storage medium that stores a program for causing a computer included in a communication apparatus complying with an IEEE802.11 series standard to:

receive, from a first other communication apparatus, data units and an indication of a sequence number assigned to at least one data unit of the data units;

perform, to a second other communication apparatus, first transmission of a data frame including the sequence number and the at least one data unit;

receive, from the second other communication apparatus, a first reception confirmation with respect to the data frame transmitted in the first transmission; and perform, to the first other communication apparatus, second transmission of information of the sequence number of the data unit received by the second other communication apparatus, which is included in the first reception confirmation, wherein every time the first reception confirmation is received, the communication apparatus transmits, to the first other communication apparatus, the information of the sequence number included in the first reception confirmation, and wherein the computer transmits, to the first other communication apparatus, a second reception confirmation including the information of the sequence number of the data unit received by the second other communication apparatus and including information indicating that the second reception confirmation is a reception confirmation for multi-access point coordination.

10. A communication apparatus complying with an IEEE802.11 series standard, comprising:

at least one memory that stores a set of instructions; and at least one processor that executes the instructions, the instructions, when executed, causing the communication apparatus to perform operations including:

receiving, from a first other communication apparatus, data units and an indication of a sequence number assigned to at least one data unit of the data units;

transmitting, to a second other communication apparatus, a data frame including the sequence number and the at least one data unit;

receiving, from the second other communication apparatus, a first reception confirmation with respect to the transmitted data frame; and transmitting, to the first other communication apparatus, information of the sequence number of the data unit received by the second other communication apparatus, which is included in the first reception confirmation, wherein after receiving a plurality of first reception confirmations, the communication apparatus collectively transmits, to the first other communication apparatus, information of the sequence numbers included in the first reception confirmations, and wherein the communication apparatus transmits, to the first other communication apparatus, a second reception confirmation including the information of the sequence number of the data unit received by the second other communication apparatus and including information indicating that the second reception confirmation is a reception confirmation for multi-access point coordination.

* * * * *